United States Patent
Suzuki

(10) Patent No.: US 11,731,694 B2
(45) Date of Patent: Aug. 22, 2023

(54) STEERING CONTROL APPARATUS AND STEERING CONTROL METHOD

(71) Applicant: DENSO CORPORATION, Kariya (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 152 days.

(21) Appl. No.: 16/931,330

(22) Filed: Jul. 16, 2020

(65) Prior Publication Data
US 2021/0016827 A1 Jan. 21, 2021

(30) Foreign Application Priority Data

Jul. 18, 2019 (JP) ................................ 2019-132784

(51) Int. Cl.
| | | |
|---|---|---|
| *B62D 5/04* | (2006.01) | |
| *B62D 6/10* | (2006.01) | |
| *G06F 21/45* | (2013.01) | |
| *G06F 21/31* | (2013.01) | |
| *B62D 6/00* | (2006.01) | |
| *B62D 5/00* | (2006.01) | |

(52) U.S. Cl.
CPC .............. *B62D 6/008* (2013.01); *B62D 5/006* (2013.01); *B62D 5/0481* (2013.01)

(58) Field of Classification Search
None
See application file for complete search history.

(56) References Cited

U.S. PATENT DOCUMENTS

| | | | |
|---|---|---|---|
| 2016/0114832 A1* | 4/2016 | Taniguchi | ................ B62D 6/04 701/41 |
| 2017/0137056 A1* | 5/2017 | Aoki | .................. B62D 15/0225 |
| 2017/0247051 A1* | 8/2017 | Matsuo | ................ B62D 5/0466 |
| 2018/0086341 A1* | 3/2018 | Taniguchi | .............. B62D 6/002 |
| 2020/0198694 A1* | 6/2020 | Kawamura | ............ B62D 5/049 |

FOREIGN PATENT DOCUMENTS

| | | |
|---|---|---|
| JP | 2014-213781 A | 11/2014 |
| JP | 2015-020691 A | 2/2015 |

* cited by examiner

*Primary Examiner* — Adam D Tissot
*Assistant Examiner* — Laura E Linhardt
(74) *Attorney, Agent, or Firm* — Maschoff Brennan

(57) ABSTRACT

In a steering control apparatus, a reaction force torque command value is calculated so that a detection value of a torque sensor follows a target value obtained by adding at least a viscosity command value and a return command value to a steering torque command value, and an electric current that flows to a reaction force rotary electric machine is controlled based on the reaction force torque command value. Whether a steering state is a turning state or a returning state is determined by comparing a physical quantity corresponding to an output torque of a reaction force device and the detection value of the torque sensor. Characteristics of one or more of a reaction force amount operation, a viscosity amount operation, and a return amount operation are made differ between the turning state and the returning state.

18 Claims, 18 Drawing Sheets

STEERING CONTROL APPARATUS AND STEERING CONTROL METHOD

CROSS REFERENCE TO RELATED APPLICATION

The present application claims the benefit of priority from Japanese Patent Application No. 2019-132784 filed on Jul. 18, 2019. The entire disclosure of the above application is incorporated herein by reference.

TECHNICAL FIELD

The present disclosure relates to a steering control apparatus and a steering control method.

BACKGROUND

Conventionally, there has been known a technique for determining whether a steering state of a vehicle is a turning state or a returning state.

SUMMARY

According to an aspect of the present disclosure, a reaction force torque command value is calculated so that a detection value of a torque sensor follows a target value obtained by adding at least a viscosity command value and a return command value to a steering torque command value, and an electric current that flows to a reaction force rotary electric machine is controlled based on the reaction force torque command value. Whether a steering state is a turning state or a returning state is determined by comparing a physical quantity corresponding to an output torque of a reaction force device and the detection value of the torque sensor. Characteristics of one or more of a reaction force amount operation, a viscosity amount operation, and a return amount operation are made differ between the turning state and the returning state.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
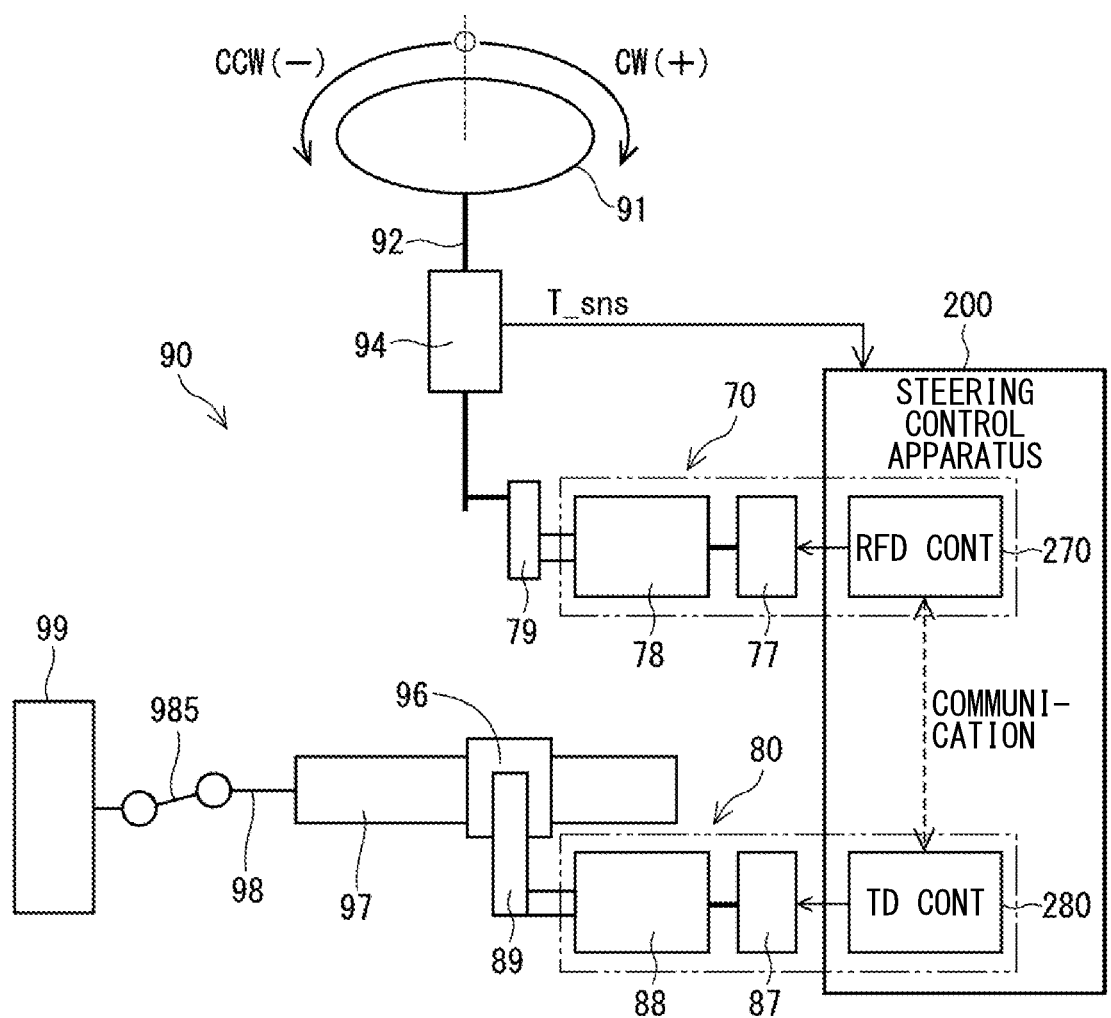
FIG. 1 is a diagram showing an overall configuration of a steer-by-wire system to which a steering control apparatus according to each embodiment is applied.

There is a steering control apparatus that calculates a steering state quantity, which is an index indicating whether a steering state is a turning state or a returning state, based on a detection value of a steering torque in an electric power steering system. Further, the steering control apparatus changes a control constant of an adjustment torque operation in accordance with the steering state quantity, that is, between the turning state and the returning state.

A reaction force device in a steer-by-wire system is controlled with two inputs of a driver's steering torque and a motor torque, whereas three inputs of a driver's steering torque, a motor torque, and a road surface reaction force are used in an assist control of the electric power steering system. Further, in reality, a loss torque is generated in a gear and a motor.

A steering control apparatus according to a first aspect of the present disclosure is for controlling a reaction force device and a steering device in a steer-by-wire system that includes the reaction force device, the steering device, and a torque sensor.

The reaction force device is connected to a steering wheel and includes a reaction force rotary electric machine, a reaction force power converter configured to drive the reaction force rotary electric machine, and a reaction force reducer configured to reduce an output of the reaction force rotary electric machine. The turning device is configured to turn a wheel and includes a turning rotary electric machine, a turning power converter configured to drive the turning rotary electric machine, and a turning reducer configured to reduce an output of the turning rotating electric machine. The torque sensor is configured to detect a steering input by a driver. An output torque command value of the reaction force device obtained by multiplying a torque command value of the reaction force rotary electric machine by a reduction ratio of the reaction force reducer is defined as the reaction force torque command value.

The steering control apparatus includes a reaction force control unit, a viscosity control unit, a return control unit, a steering wheel torque control unit, a reaction force device current control unit, and a turning and returning determination unit.

The reaction force control unit is configured to calculate a reaction force command value of the reaction force device by a reaction force amount operation based on a physical quantity corresponding to an output torque of the turning device, and configured to calculate a steering torque command value based on the reaction force command value. The viscosity control unit is configured to calculate a viscosity command value of the reaction force device by a viscosity amount operation based on a physical quantity corresponding to a rotational angular velocity of the reaction force device. The return control unit is configured to calculate a return command value of the reaction force device by a return amount operation based on a physical quantity corresponding to an angle of the reaction force device and a physical quantity corresponding to a vehicle speed.

The steering wheel torque control unit is configured to calculate the reaction torque command value so that the detection value of the torque sensor follows a target value obtained by adding at least the viscosity command value and the return command value to the steering torque command value. The reaction force device current control unit is configured to control a current that flows to the reaction force rotary electric machine based on the reaction force torque command value.

The turning and returning determination unit is configured to compare a physical quantity corresponding to the output torque of the reaction force device with the detection value of the torque sensor to determine where a steering state is a turning state in which the steering wheel is turned by the driver or a returning state in which the steering wheel is returned by the reaction force rotary electric machine. One or more of the reaction force control unit, the viscosity control unit, and the return control unit make characteristics of corresponding one or more of the reaction force amount operation, the viscosity amount operation, and the return amount operation differ between the turning state and the returning state.

A steering control apparatus according to a second aspect of the present disclosure is for controlling a reaction force device and a steering device in a steer-by-wire system that includes the reaction force device, the steering device, and a torque sensor.

The reaction force device is connected to a steering wheel and includes a reaction force rotary electric machine, a reaction force power converter configured to drive the reaction force rotary electric machine, and a reaction force reducer configured to reduce an output of the reaction force rotary electric machine. The turning device is configured to turn a wheel and includes a turning rotary electric machine, a turning power converter configured to drive the turning rotary electric machine, and a turning reducer configured to reduce an output of the turning rotating electric machine. The torque sensor is configured to detect a steering input by a driver. An output torque command value of the reaction force device obtained by multiplying a torque command value of the reaction force rotary electric machine by a reduction ratio of the reaction force reducer is defined as the reaction force torque command value.

The steering control apparatus includes a processor and a memory. The memory stores a program configured to, when executed by the processor, cause the processor to: calculate a reaction force command value of the reaction force device by a reaction force amount operation based on a physical quantity corresponding to an output torque of the turning device, and calculate a steering torque command value based on the reaction force command value; calculate a viscosity command value of the reaction force device by a viscosity amount operation based on a physical quantity corresponding to a rotational angular velocity of the reaction force device; calculate a return command value of the reaction force device based on a return amount operation based on a physical quantity corresponding to an angle of the reaction force device and a physical quantity corresponding to a vehicle speed; calculate the reaction force torque command value so that a detection value of the torque sensor follows a target value obtained by adding at least the viscosity command value and the return command value to the steering torque command value; control an electric current that flows to the reaction force rotary electric machine based on the reaction force torque command value; compare a physical quantity corresponding to an output torque of the reaction force device and the detection value of the torque sensor to determine whether a steering state is a turning state in which the steering wheel is turned by the driver or a returning state in which the steering wheel is returned by the reaction force rotary electric machine; and make characteristics of one or more of the reaction force amount operation, the viscosity amount operation, and the return amount operation differ between the turning state and the returning state.

A steering control method according to a third aspect of the present disclosure is for controlling a reaction force device and a steering device in a steer-by-wire system that includes the reaction force device, the steering device, and a torque sensor.

The reaction force device is connected to a steering wheel and includes a reaction force rotary electric machine, a reaction force power converter configured to drive the reaction force rotary electric machine, and a reaction force reducer configured to reduce an output of the reaction force rotary electric machine. The turning device is configured to turn a wheel and includes a turning rotary electric machine, a turning power converter configured to drive the turning rotary electric machine, and a turning reducer configured to reduce an output of the turning rotating electric machine. The torque sensor is configured to detect a steering input by a driver. An output torque command value of the reaction force device obtained by multiplying a torque command value of the reaction force rotary electric machine by a reduction ratio of the reaction force reducer is defined as the reaction force torque command value.

The steering control method includes: calculating a reaction force command value of the reaction force device by a reaction force amount operation based on a physical quantity corresponding to an output torque of the turning device, and calculating a steering torque command value based on the reaction force command value; calculating a viscosity command value of the reaction force device by a viscosity amount operation based on a physical quantity corresponding to a rotational angular velocity of the reaction force device; calculating a return command value of the reaction force device based on a return amount operation based on a physical quantity corresponding to an angle of the reaction force device and a physical quantity corresponding to a vehicle speed; calculating the reaction force torque command value so that a detection value of the torque sensor follows a target value obtained by adding at least the viscosity command value and the return command value to the steering torque command value; controlling an electric current that flows to the reaction force rotary electric machine based on the reaction force torque command value; comparing a physical quantity corresponding to an output torque of the reaction force device and the detection value of the torque sensor to determine whether a steering state is a turning state in which the steering wheel is turned by the driver or a returning state in which the steering wheel is returned by the reaction force rotary electric machine; and making characteristics of one or more of the reaction force amount operation, the viscosity amount operation, and the return amount operation differ between the turning state and the returning state.

In the steering control apparatus and the steering control method according to the first to third aspects, the turning state and the returning state can be determined based on the physical quantity corresponding to the output torque of the reaction force device and the detection value of the torque sensor by utilizing the fact that the reaction force device in the steer-by-wire system is controlled with two inputs of the driver's steering torque and the motor torque, and there is a loss torque in a gear and a motor. Since the determination is made only by the torque as described above, it is possible to determine turning or returning before an actual angle change occurs in contrast with a case where a speed is used. Then, a steering feeling can be appropriately adjusted by making the characteristics of one or more of the reaction force amount operation, the viscosity amount operation, and the return amount operation differ between the turning state and the returning state.

Steering control apparatus according to multiple embodiments of the present disclosure will be described with reference to the drawings. The steering control apparatus control a reaction force device and a turning device in a steer-by-wire system. In the following embodiments, substantially same structural parts are designated with the same reference numerals thereby to simplify the description. The following first to third embodiments are collectively referred to as "a present embodiment."

FIG. 1 shows an overall configuration of a steer-by-wire system 90 in which a steering mechanism and a turning mechanism are mechanically separated. In FIG. 1, only one of wheels 99 is shown, and the illustration of the wheel 99 on the opposite side is omitted. The steer-by-wire system 90 includes a reaction force device 70, a turning device 80, and a torque sensor 94.

The reaction force device 70 includes a reaction force rotary electric machine 78, a reaction force power converter 77 that drives the reaction force rotary electric machine 78, and a reaction force reducer 79 that reduces an output of the reaction force rotary electric machine 78. The reaction force device 70 is connected to a steering wheel 91 via a steering shaft 92. With the steer-by-wire system 90, a driver cannot directly sense a reaction force to a steering. Therefore, the reaction force rotary electric machine 78 rotates the steering wheel 91 so as to apply a reaction force to the steering, and gives an appropriate steering feeling to the driver.

The turning device 80 includes a turning rotary electric machine 88, a turning power converter 87 that drives the turning rotary electric machine 88, and a turning reducer 89 that reduces an output of the turning rotary electric machine 88. A rotation of the turning rotary electric machine 88 is transmitted from the turning reducer 89 to the wheels 99 via a pinion gear 96, a rack shaft 97, tie rods 98, and knuckle arms 985. Specifically, a rotational movement of the pinion gear 96 is converted into a linear movement of the rack shaft 97, and the tie rods 98 provided at both ends of the rack shaft 97 reciprocate the knuckle arms 985, thereby to turn the wheels 99.

The torque sensor 94 detects a steering input applied to the steering shaft 92 by the driver based on a torsional displacement of a torsion bar. A detection value T_sns of the torque sensor 94 is input to the steering control apparatus 200.

A steering angle of the steering wheel 91 is defined as positive in a CW direction and negative in a CCW direction in FIG. 1 according to a rotation direction with respect to a neutral position of the steering wheel 91. Correspondingly, positive and negative of a turning angle of the wheels 99 are defined. An angular velocity is defined by the same sign as the turning angle. The detection value T_sns of the torque sensor 94 when the driver turns the steering wheel 91 in the CW direction is positive.

Furthermore, an output torque of the reaction force device 70 when the steering wheel 91 is turned in the CW direction by the reaction force device 70 is also positive. When the driver holds the steering wheel 91 while the output torque of the reaction force device 70 is acting in the CW direction, since the driver applies a torque in the CCW direction, the detection value T_sns of the torque sensor 94 becomes negative.

The steering control apparatus 200 is mainly composed of a microcomputer and the like, and internally includes, although not shown in the figure, a CPU, a ROM, a RAM, an I/O, a bus line for connecting these components, and the like. Each process executed by the steering control apparatus 200 may be software process or may be hardware process. The software process may be implemented by causing the CPU to execute a program. The program may be stored beforehand in a memory device such as a ROM, that is, in a computer-readable non-transitory tangible storage medium. The hardware process may be implemented by a special purpose electronic circuit.

As shown in FIG. 1, in the present embodiment, a reaction force device control unit (RFD CONT) 270 and a turning device control unit (TD CONT) 280 are provided in a physically separated state. The two control units 270 and 280 cooperate with each other to function as the steering control apparatus 200 by communicating information with each other via a vehicle network such as CAN communication or a dedicated communication line.

For example, as indicated by a dashed double-dotted line, the reaction force device 70 includes the reaction force device control unit 270, the reaction force power converter 77, and the reaction force rotary electric machine 78 that are integrally formed. Similarly, the turning device 80 includes the turning device control unit 280, the turning power converter 87, and the turning rotary electric machine 88 that are integrally formed. Such a so-called "integrated electromechanical" motor structure is well known in a field of electric power steering devices.

Next, with reference to FIG. 2, a specific configuration of the power converters 77 and 87 and the rotary electric machines 78 and 88 in the reaction force device 70 and the turning device 80 will be described. Since the reaction force device 70 and the turning device 80 have the same configuration, both reference numerals are shown in the figure. In the following description, the description of "reaction force" and "turning" will be omitted, and the reference numerals of the components of the reaction force device 70 will be used as a representative. It should be noted that the reference numerals shall be replaced with regard to the turning device 80.

The rotary electric machine 78 according to the present embodiment is a two-system three-phase brushless motor, and the power converter 77 is a two-system three-phase inverter. The rotary electric machine 78 has a first system winding (1ST WIND) 781 and a second system winding (2ND WIND) 782 as two systems of windings. The windings 781 and 782 of the two systems are arranged with their phases shifted by an electrical angle of 30 degrees, for example. A torque Tm output by the rotary electric machine 78 is the sum of a first system torque Tm1 generated by energizing the first system winding 781 and second system torque Tm2 generated by energizing the second system winding 782.

The power converter 77 includes a first system power converter (1ST PWR CONV) 771 that energizes the first system winding 781 and a second system power converter (2ND PWR CONV) 772 that energizes the second system winding 782. In the example of FIG. 2, each of the two-system power converters 771 and 772 converts a direct-current (DC) power supplied from a common battery 11 into a three-phase alternating-current (AC) power. In another example, each the power converters 771, 772 may be connected to an individual battery.

Next, schematic configurations of the reaction force device control unit 270 and the turning device control unit 280 will be described with reference to FIG. 3 and FIG. 4. In this part, prior to the description of the detailed control configurations of the respective embodiments shown in FIG. 5 and FIG. 15, basic configurations and unique configurations of the reaction force device 70 and the turning device 80 common to the respective embodiments will be described. Symbols of parameters relating to the output of the reaction force device 70 are attached with "r," and symbols of parameters relating to the output of the turning device 80 are attached with "t."

Figure 3:
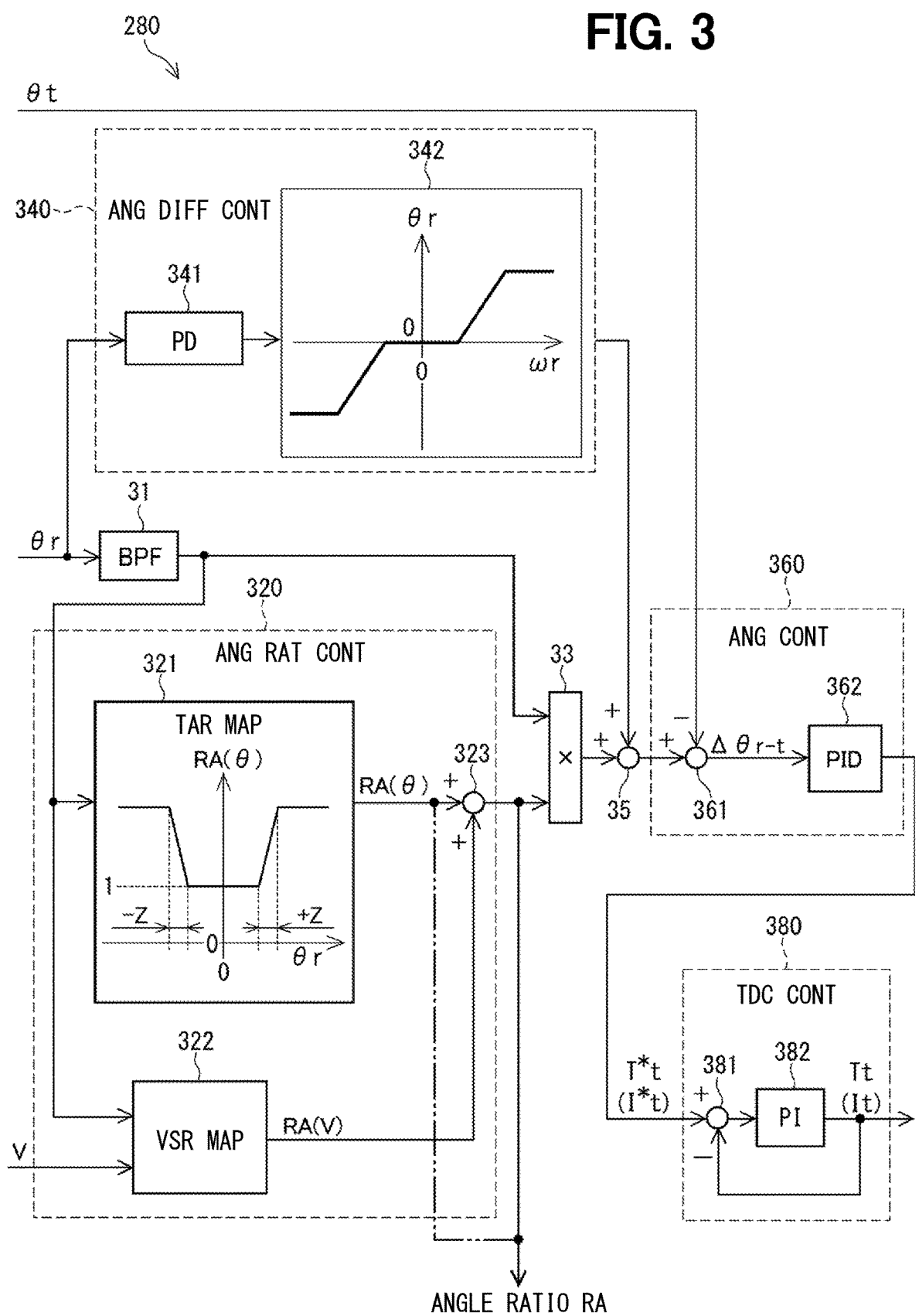
FIG. 3 is a block diagram showing a schematic configuration of a turning device control unit.
Figure 4:
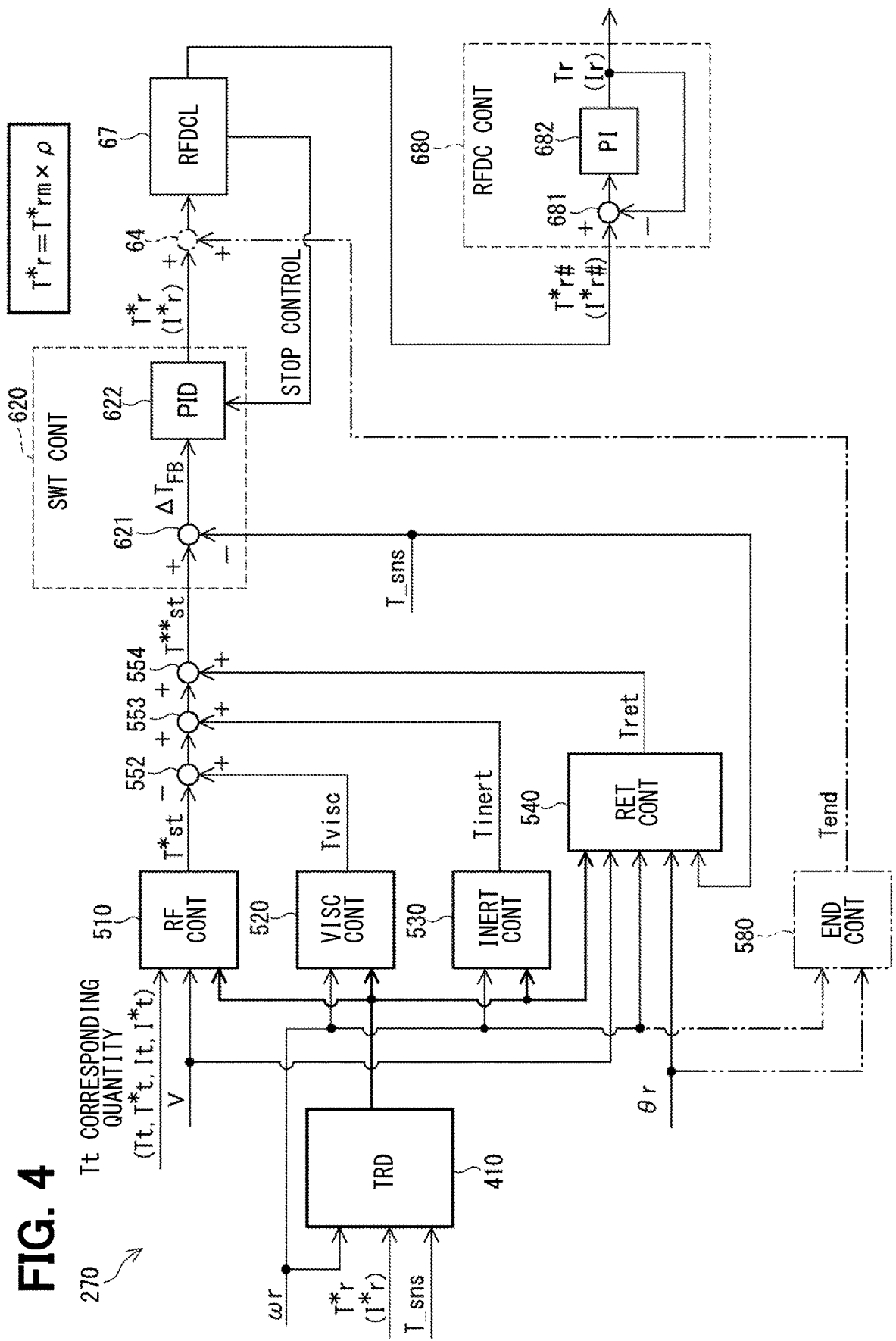
FIG. 4 is a block diagram showing a schematic configuration of a reaction force device control unit.

In FIG. 3 and FIG. 4, values such as an angle θr and an angular velocity ωr of the reaction force device 70 and an angle θt of the turning device 80 are values after conversion by multiplying rotation angles of the rotary electric machines 78 and 88 by reduction ratios of the reducers 79 and 89. First, FIG. 3 shows the schematic configuration of the turning device control unit 280. The angle θr of the reaction force device 70 is input to an angle ratio control unit (ANG RAT CONT) 320 and a multiplier (x) 33 via a bandpass filter (BPF) 31. The angle ratio control unit 320 includes a turning angle response map (TAR MAP) 321, a vehicle speed response map (VSR MAP) 322, and an adder 323. The angle ratio control unit 320 calculates an angle ratio RA of the turning angle θt of the turning device 80 with respect to the angle θr of the reaction force device 70 according to the angle θr of the reaction force device 70 and the vehicle speed V.

The turning angle response map 321 calculates a turning angle response term RA(θ) according to the angle θr of the reaction force device 70. The turning angle response term RA(θ) is set to the minimum value 1 in a relatively small region where the absolute angle value |θr| includes 0, and the turning angle response term RA(θ) is set to a fixed maximum value in a region where the absolute angle value |θr| is relatively large. In a predetermined angle region +Z, −Z, the turning angle response term RA(θ) changes from the minimum value to the maximum value according to the angle θr of the reaction force device 70. Hereinafter, the positive and negative angle regions +Z and −Z will be collectively referred to as "±Z."

The vehicle speed response map 322 calculates a vehicle speed response term RA(V) according to the vehicle speed V. A description of a specific configuration of the vehicle speed response map 322 and an example of the map is omitted. The turning angle response term RA(θ) calculated by the turning angle response map 321 and the vehicle speed response term RA(V) calculated by the vehicle speed response map 322 are added by the adder 323.

Figure 5:
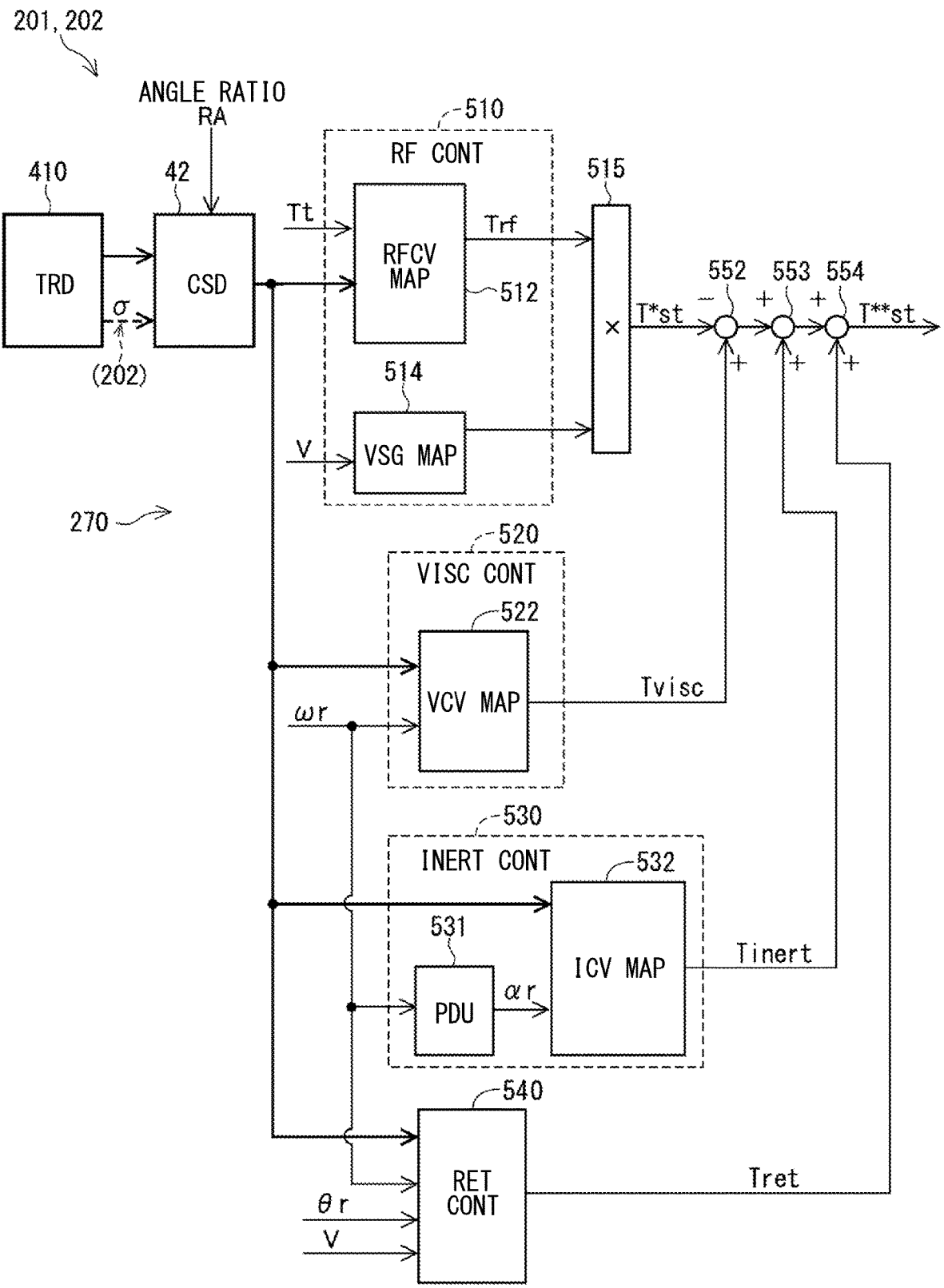
FIG. 5 is a block diagram of a steering control apparatus according to first and second embodiments.
Figure 15:
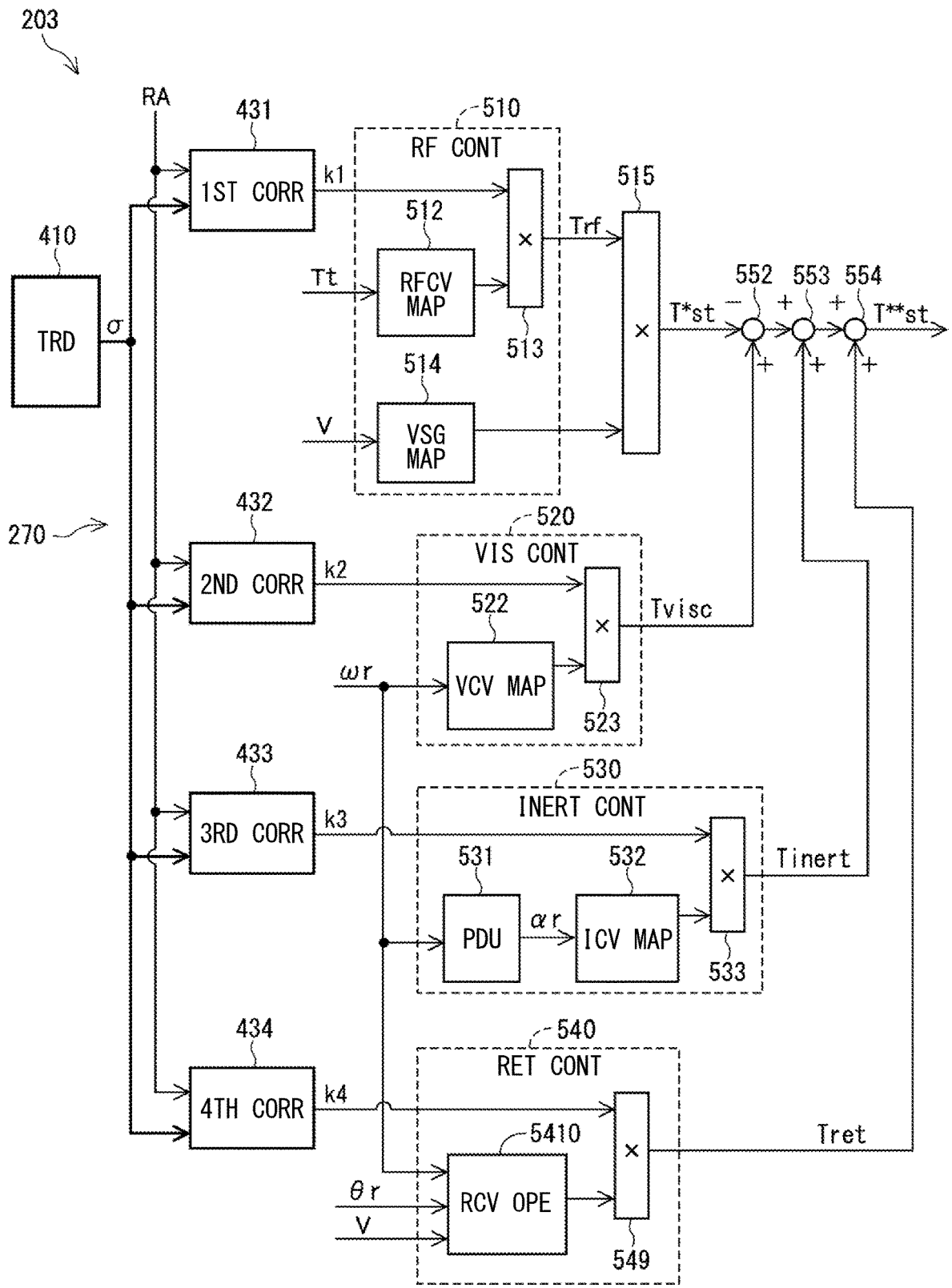
FIG. 15 is a block diagram of a steering control apparatus according to a third embodiment.

The angle ratio RA added by the adder 323 is input to the multiplier 33 and is also notified to a control switching determination unit 42 shown in FIG. 5 and correction operation units 431 to 434 shown in FIG. 15, and the like. Alternatively, as indicated by a dashed double-dotted line, only the turning angle response term RA(θ) before the vehicle speed response term RA(V) is added may be notified to the control switching determination unit 42, the correction operation units 431 to 434, and the like. Instead of the angle ratio RA, an angle ratio corresponding quantity converted from the angle θr of the reaction force device 70 may be notified.

Further, the angle θr of the reaction force device 70 is input to an angle differentiation control unit 340. A pseudo differentiator (PD) 341 of the angle differentiation control unit (ANG DIFF CONT) 340 calculates the angular velocity ωr based on a time change rate of the angle θr. An angular velocity-angle map 342 calculates a correction value of the angle θr having a positive correlation with the angular velocity ωr. The calculated correction value of the angle θr is added to an output of the multiplier 33 by an adder 35.

A deviation calculation unit 361 of an angle control unit (ANG CONT) 360 calculates an angle deviation $\Delta\theta_{r-t}$ between the value obtained by multiplying the angle θr of the reaction force device 70 by the angle ratio and the angle θt of the turning device 80. A PID controller 362 calculates a turning torque command value T*t or a current command value I*t of the turning rotary electric machine 88 corresponding to the turning torque command value T*t so that the angle deviation $\Delta\theta_{r-t}$ approaches 0. A turning device current control unit (TDC CONT) 380 includes a deviation calculator 381 and a PI controller 382, and controls the current that flows to the turning rotary electric machine 88 by feedback control of the turning torque Tt or the current It.

The angle deviation Δθ calculated by the deviation calculation unit 361 is exactly the difference between "the value obtained by multiplying the angle θr of the reaction force device 70 by the angle ratio RA" and the angle θt of the turning device 80. However, in the present specification, "the value obtained by multiplying the angle θr of the reaction force device 70 by the angle ratio RA" is regarded as "the angle θr of the reaction force device 70," and "the deviation between the angle θr of the reaction force device 70 and the angle θt of the turning device 80" is referred to as "the angle deviation $\Delta\theta_{r-t}$."

FIG. 4 shows a basic configuration of the reaction force device control unit 270. A steering wheel torque control unit (SWT CONT) 620 calculates a reaction force torque command value T*r based on torque command values calculated by a reaction force control unit (RF CONT) 510, a viscosity control unit (VISC CONT) 520, an inertia control unit (INERT CONT) 530, and a return control unit (RET CONT) 540. The reaction force torque command value T*r is "an output torque command value of the reaction force device 70" obtained by multiplying the torque command value T*rm of the reaction force rotary electric machine 78 by a reduction ratio ρ of the reaction force reducer 79.

The reaction force control unit 510 calculates a reaction force command value Trf of the reaction force device 70 by a reaction force amount operation based on "a physical quantity corresponding to the output torque of the turning device 80," and further calculates a steering torque command value T*st by multiplying the reaction force command value Trf by a speed gain corresponding to the vehicle speed V. "The physical quantity corresponding to the output torque of the turning device 80" corresponds to the steering torque Tt, the steering torque command value T*t, a current It that flows to the turning rotary electric machine 88, the current command value I*t, or the like. Hereinafter, "the physical quantity corresponding to the output torque of the turning device 80" will be abbreviated as "a turning torque corresponding quantity." In FIG. 5 and FIG. 15, only the symbol "Tt" is shown as an input of the turning torque corresponding quantity.

The viscosity control unit 520 calculates a viscosity command value Tvisc of the reaction force device 70 by a viscosity amount operation based on a physical quantity corresponding to the rotational angular velocity ωr of the reaction force device 70." In the figure, only the symbol "ωr" is shown as a representative of a "physical quantity corresponding to the rotational angular velocity ωr of the reaction force device." In the specification, "the rotational angular velocity ωr" is also simply referred to as "the angular velocity ωr."

As shown in FIG. 5, the inertia control unit 530 includes a pseudo differentiating unit (PDU) 531 that calculates a rotational angular acceleration αr from a change rate of the rotational angular velocity ωr, and an inertia command value map (ICV MAP) 532 based on the rotational angular acceleration αr. The inertia control unit 530 calculates an inertia command value Tinert of the reaction force device 70 by calculating an inertial amount operation based on "a physical quantity corresponding to the rotational angular acceleration αr of the reaction force device 70." In the figure, only the symbol "ωr" is shown as a representative of "the physical quantity corresponding to the rotational angular velocity ωr of the reaction force device 70."

The return control unit 540 calculates a return command value Tret acting in a direction to return the steering wheel 91 to the neutral position by a return amount operation based on the angle θr and the angular velocity ωr of the reaction force device 70, the vehicle speed V, and the detection value T_sns of the torque sensor 94.

In the adders 552, 553, 554, the viscosity command value Tvisc, the inertia command value Tinert, and the return command value Tret are sequentially added to a sign inversion value (−T*st) of the steering torque command value T*st. The value after addition by the adder 554 is input to the steering wheel torque control unit 620 as "a target value T**st based on the steering torque command value T*st."

A deviation calculation unit 621 of the steering wheel torque control unit 620 calculates a torque deviation $\Delta T_{FB}$ between the target value T**st and the detection value T_sns of the torque sensor 94. In order to distinguish from a torque difference $\Delta T_{LT}$ in FIG. 6, FIG. 13, and the like, the symbol $\Delta T_{FB}$ is used to mean "a torque deviation in feedback control." A PID controller 622 performs a PID control so that the torque deviation $\Delta T_{FB}$ approaches 0. In this way, the steering wheel torque control unit 620 calculates a reaction force torque command value T*r by servo control so that the detection value T_sns of the torque sensor 94 follows the target value T**st.

Since the present embodiment mainly focuses on the operation during turning and returning steering, an end control unit (END CONT) 580 regarding a turning limit is shown by the dashed double-dotted line for reference. The end control unit 580 calculates an end presentation command value Tend based on the angle θr and the angular velocity ωr of the reaction force device 70. The end presentation command value Tend is added to the reaction force torque command value T*r by an adder 64.

A reaction force device current control unit (RFDC CONT) 680 includes a deviation calculator 681 and a PI controller 682. The reaction force device current control unit 680 controls a current that flows to the reaction force rotary electric machine 78 based on the reaction force torque command value T*r by feedback control of the reaction force torque Tr or the current Ir.

Further, a reaction force device current limiting unit (RFDCL) 67 is provided in an operation process of the reaction force torque command value T*r. The reaction force device current limiting unit 67 limits the reaction force device current Ir to a value equal to or less than the current limit value in order to protect the reaction force device 70 from overheating, limit the power, and prevent the power drop. The reaction force torque command value and the reaction force device current command value before limiting by the reaction force device current limiting unit 67 are denoted as T*r and I*r, respectively, and the reaction force torque command value and the reaction force device current command value after limiting are denoted as T*r# and I*r#, respectively. When the absolute value |I*r| of the reaction force device current command value before limiting exceeds the current limit value, the output of the reaction force device 70 is limited.

When current limiting is performed by the reaction force device current limiting unit 67, the PID controller 622 of the steering wheel torque control unit 620 is also notified and the control is stopped. The term "the control is stopped" means that an integral calculation by an integral calculator provided at the final stage of the PID controller 622 is stopped, for example.

The reaction force device control unit 270 of the steering control apparatus 200 according to the present embodiment further includes a turning and returning determination unit (TRD) 410 as a unique configuration. The turning and returning determination unit 410 acquires the reaction force torque command value T*r (or the reaction force device current command value I*r) and the detection value T_sns of the torque sensor 94. Instead of the reaction force torque command value T*r, the actual torque Tr of the reaction force device 70 may be acquired as "a physical quantity corresponding to the output torque of the reaction force device 70." In addition to the above, the turning and returning determination unit 410 may acquire the angular velocity ωr of the reaction force device 70. Hereinafter, an example will be described in which the reaction force torque command value T*r is used as a representative of "the physical quantity corresponding to the output torque of the reaction force device 70."

The turning and returning determination unit 410 compares the reaction force torque command value T*r and the detection value T_sns of the torque sensor 94 to determine whether a steering state is a turning state and a returning state. The turning state is a state in which the steering wheel 91 is turned by the driver. The returning state is a state in which the steering wheel 91 is returned by the reaction force rotary electric machine 78.

The determination result by the turning and returning determination unit 410 is output to the reaction force control unit 510, the viscosity control unit 520, the inertia control unit 530, and the return control unit 540. The respective control units 510, 520, 530 and 540 make the characteristics of the corresponding reaction force amount operation, viscosity amount operation, inertia amount operation and return amount operation differ between the turning state and the returning state. The term "differ" includes a control of "changing continuously or stepwisely including an intermediate value between two values" in addition to a control of "switching between two values."

In the present embodiment, an example will be described in which the characteristics of all of the four control units 510, 520, 530, and 540 are made differ between the turning state and the returning state. However, in another embodiment, the characteristics of any one to three of the four control units 510, 520, 530, and 540 may be made differ in the turning state and the returning state.

First Embodiment

Next, the description of each embodiment will be made. The reference numerals of the steering control apparatus of the first to third embodiments are 201 to 203, respectively. Firstly, the first embodiment will be described with reference to FIG. 5 to FIG. 12. The block diagram of FIG. 5 is almost common to the steering control apparatus 201 of the first embodiment and the steering control apparatus 202 of the second embodiment. Specifically, regarding the signal output from the turning and returning determination unit 410 to a control switching determination unit (CSD) 42, only the determination result is output in the first embodiment, whereas a state quantity σ described later is output in the second embodiment.

Hereinafter, the description regarding FIG. 5 other than the state quantity σ is common to the first embodiment and the second embodiment. In addition, FIG. 5 illustrates a calculation of the target value T**st based on the steering torque command value T*st, and a control configuration after the steering wheel torque control unit 620 is based on FIG. 4.

As a control configuration not shown in FIG. 4, the steering control apparatus 201 and 202 have the control switching determination unit 42. The control switching determination unit 42 acquires the angle ratio RA or the angle ratio corresponding quantity calculated by the angle ratio control unit 320 in FIG. 3. As will be described later with reference to FIG. 8, the control switching determination unit 42 operates a control switching flag between the turning state and the returning state based on the angle ratio RA, and outputs the control switching flag to the reaction force control unit 510, the viscosity control unit 520, the inertia control unit 530 and the return control unit 540.

The reaction force control unit 510, the viscosity control unit 520, the inertia control unit 530, and the return control unit 540 respectively calculates a reaction force command value Trf, a viscosity command value Tvisc, an inertia command value, and a return command value Tret using maps that define characteristics of outputs with respect to inputs.

As shown in FIG. 5, the reaction force control unit 510 has a reaction force command value map (RFCV MAP) 512 and a vehicle speed gain map (VSG MAP) 514. The viscosity control unit 520 has a viscosity command value map (VCV MAP) 522, and the inertia control unit 530 has an inertia command value map (ICV MAP) 532. Specific examples of each map will be described later with reference to FIG. 9 and FIG. 10. Based on the control switching flag from the control switching determination unit 42, the reaction force control unit 510, the viscosity control unit 520, and the inertia control unit 530 make the command value maps differ between the turning state and the returning state.

Figure 11:
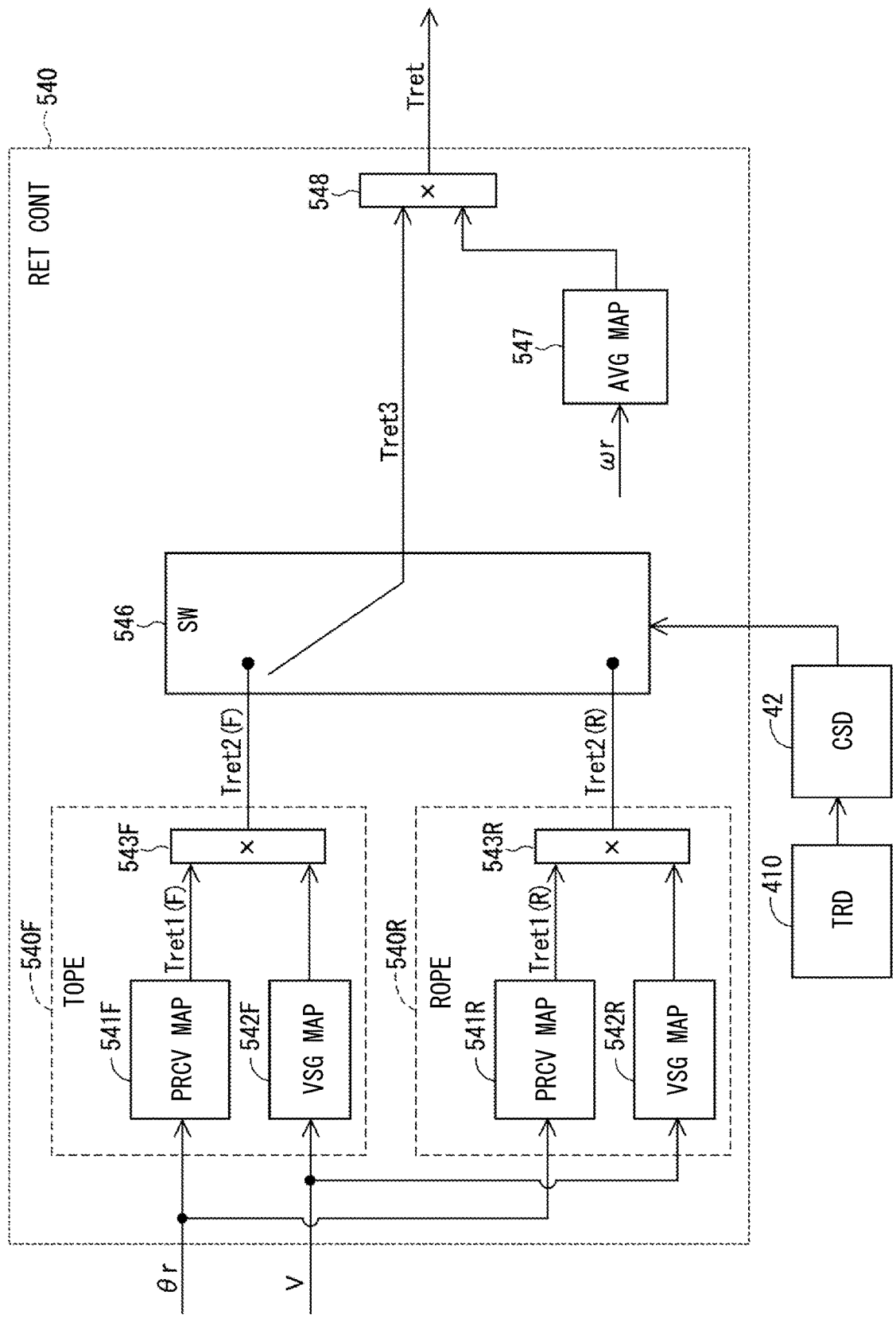
FIG. 11 is a block diagram of a return control operation by a return control unit according to the first embodiment.

The detailed control configuration of the return control unit 540 will be described later with reference to FIG. 11 and FIG. 12. The return control unit 540 may make the return command value map differ based on the control switching flag from the control switching determination unit 42, similarly to the reaction force control unit 510 and the like. Alternatively, the final return command value Trf may be made differ by manipulating a command value at an intermediate stage calculated by the map.

Next, a viewpoint of the present embodiment will be described with reference to FIG. 6. In the reaction force device 70 of the steer-by-wire system 90, in the configuration in which the output of the motor (the reaction force rotary electric machine 78) is transmitted via the reaction force reducer 79, a loss torque is generated in the gear and the motor. Further, in the present embodiment, regarding the control of the reaction force device 70 of the steer-by-wire system 90, it is premised on the control configuration in which the feedback control is performed so that the detection value T_sns of the torque sensor 94 follows the target value T**st. The detection value T_sns of the torque sensor 94 reflects the steering torque of the driver. In the description of this part, "the detection value T_sns of the torque sensor 94" is abbreviated as "the torque sensor value T_sns."

Figure 6:
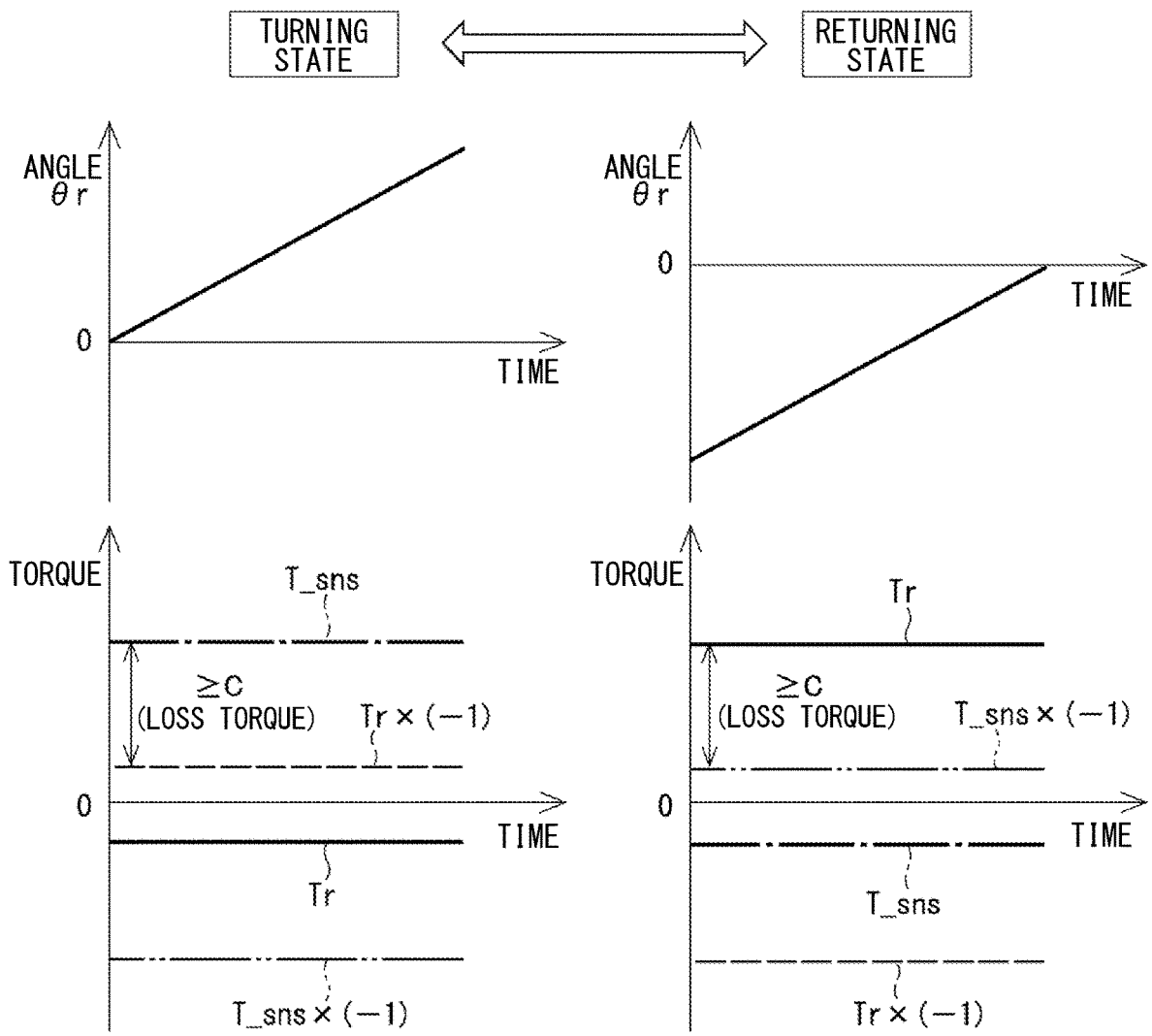
FIG. 6 is a diagram for explaining a relationship between a torque of the reaction force device and a torque sensor value in a turning state and a returning state.

In the torque diagram of FIG. 6, a solid line indicates the torque Tr of the reaction force device 70, and a long broken line indicates a sign inverted value "Tr×(−1)" of the torque of the reaction force device 70. In addition, a dashed dotted line indicates the torque sensor value T_sns, and a dashed double-dotted line indicates a sign inverted value "T_sns× (−1)" of the torque sensor value. The difference between the value of the solid line and the value of the dashed double-dotted line or the difference between the value of the dashed dotted line and the value of the long broken line in the same code area represents the loss torque. Although the actual loss torque is not always constant, in FIG. 6 and FIG. 7, a torque amount estimated to be substantially equal to the loss torque is denoted as a constant C.

The left side of FIG. 6 shows the relationship of the torque at a time of turning in a direction in which the angle θr of the reaction force device 70 increases from 0 to a positive value. At the time of turning in this direction, the torque Tr of the reaction force device 70 has a negative value whose absolute value is relatively small, and the torque sensor value T_sns has a positive value whose absolute value is relatively large. The absolute value |T_sns| of the torque sensor value is greater than or equal to a value obtained by adding the loss torque to the absolute value |Tr| of the torque of the reaction force device 70. That is, the following formula (1.1) is established.

$$|T\_sns| \geq |Tr| + C \quad (1.1)$$

By transforming the formula (1.1), the following formula (1.2) is obtained. The left side (|Tr|−|T_sns|) of the formula (1.2) is defined as "the torque difference", and is denoted as $\Delta T_{LT}$ to mean "the torque difference due to the loss torque."

$$|Tr| - |T\_sns| (= \Delta T_{LT}) \leq -C \quad (1.2)$$

The right side of FIG. 6 shows the relationship of the torque at a time of returning in a direction in which the angle θr of the reaction force device 70 increases from a negative value to 0. At the time of returning in this direction, the torque Tr of the reaction force device 70 has a positive value whose absolute value is relatively large, and the torque sensor value T_sns has a negative value whose absolute value is relatively small. The absolute value |Tr| of the torque of the reaction force device 70 is greater than or equal to a value obtained by adding the loss torque to the absolute value |T_sns| of the torque sensor value. That is, the following formula (2.1) is established.

$$|Tr| \geq |T\_sns| + C \quad (2.1)$$

By transforming the formula (2.1), the following formula (2.2) is obtained.

$$|Tr|-|T\_sns|(=\Delta T_{LT}) \geq C \tag{2.2}$$

As described above, the range of the value of the torque difference $\Delta T_{LT}$ based on the constant C corresponding to the loss torque is different between the time of turning and the time of returning. Therefore, it is possible to determine the turning state or the returning state from the relationship between the torque Tr of the reaction force device 70 and the torque sensor value T_sns.

The reaction force device 70 in the steer-by-wire system 90 is controlled with two inputs of the driver's steering torque and the motor torque, whereas three inputs of a driver's steering torque, a motor torque and a road surface reaction force are used in an assist control of an electric power steering system. Therefore, by comparing "the torque sensor value T_sns" corresponding to the driver's steering torque with "the torque Tr of the reaction force device 70" corresponding to the motor torque, it is possible to determine whether the steering state is the turning state or the returning state.

In the present embodiment, at least one of the reaction force amount operation, the viscosity amount operation, the inertial amount operation, and the return amount operation is made differ between the turning state and the returning state in order to adjust the steering feeling appropriately.

Figure 7:
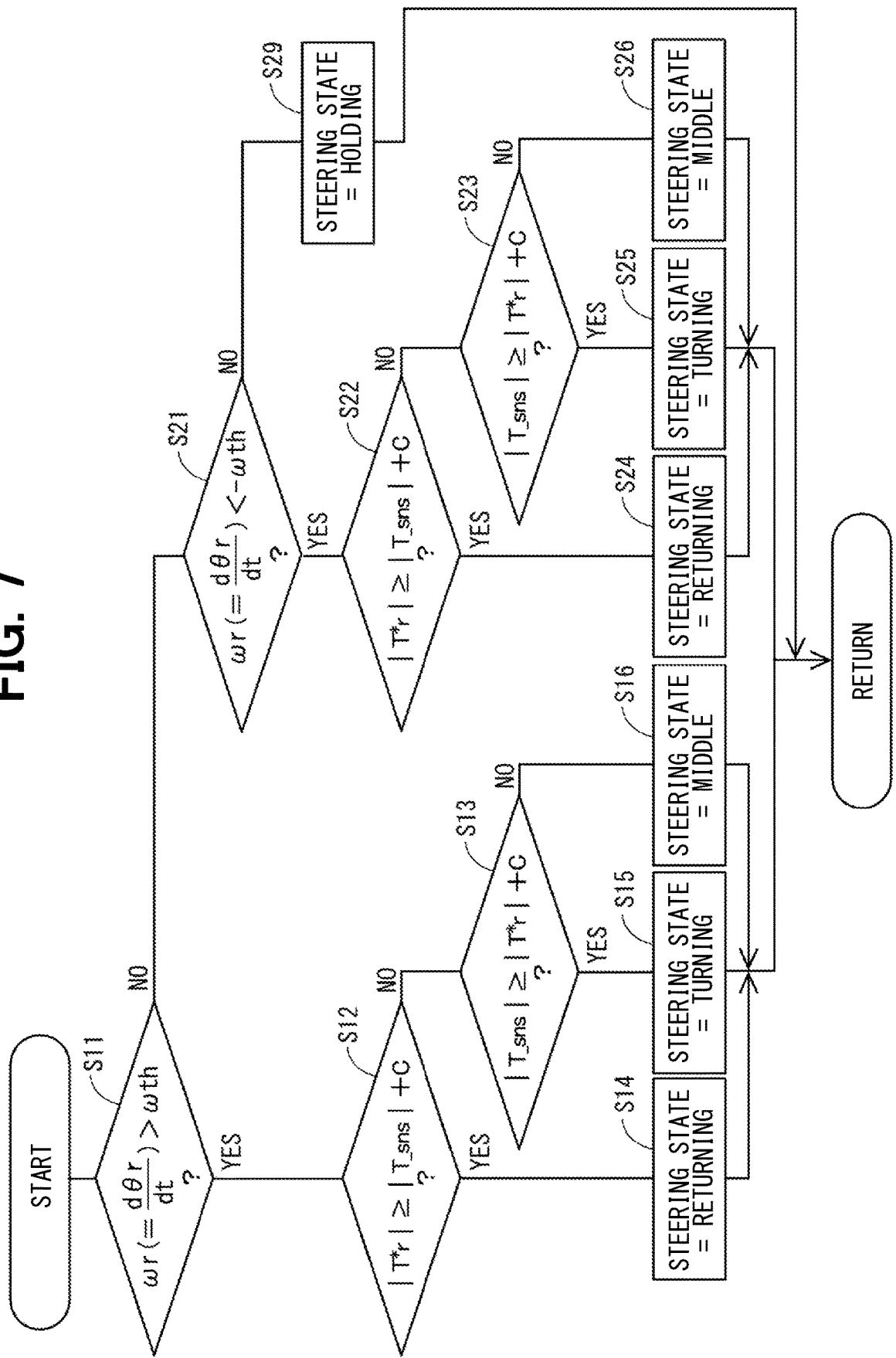
FIG. 7 is a flowchart of a turning and returning determination operation according to the first embodiment.

Next, referring to the flowchart of FIG. 7, a turning and returning determination operation by the turning and returning determination unit 410 of the first embodiment will be described. A value obtained by filtering the actual torque Tr of the reaction force device 70 with a low pass filter (LPF) may be used instead of the reaction force torque command value T*r in the flowchart, and a hysteresis may be set according to an increase or decrease in the torque. As the LPF, a filter having a larger time constant than that of a steering wheel torque control, a position control, and a current control is used.

Note that when the filter value of the actual torque Tr is used, the number of variables becomes complicated and therefore the command value T*r will be used in the flowchart. Further, instead of the reaction force torque command value T*r, the torque command value T*t of the turning device 80 or a value obtained by converting the actual torque Tt of the turning device 80 into a torque corresponding quantity of the reaction force device 70 may be used.

In S11, it is determined whether the angular velocity ωr (=dθr/dt) of the reaction force device 70 is larger than a positive angular velocity threshold ωth. If YES in S11, the process proceeds to S12. In this case, the steering wheel 91 is turning in the CW direction in FIG. 1.

In S12, it is determined whether the formula (3) corresponding to the formula (2.1) described above is established. The torque constant C in the formula is a value corresponding to the loss torque as in FIG. 6.

$$|T^*r| \geq |T\_sns|+C \tag{3}$$

If YES in S12, it is determined in S14 that "the steering state=returning." As shown in the right side of FIG. 6, when the torque sensor 94 outputs the negative torque T_sns and the reaction force device 70 outputs the positive torque Tr, the torque Tr of the reaction force device 70 is greater than or equal to the value by adding the loss torque to the sign inverted value "T_sns×(−1)" of the torque sensor value. Therefore, it is considered that the steering wheel 91 is rotating.

If NO in S12, it is determined in S13 whether the formula (4) corresponding to the formula (1.1) is established.

$$|T\_sns| \geq |T^*r|+C \tag{4}$$

If YES in S13, it is determined in S15 that "the steering state=turning." As shown in the left side of FIG. 6, when the torque sensor 94 outputs the positive torque T_sns and the reaction force device 70 outputs the negative torque Tr, the torque sensor value T_sns is greater than or equal to the value obtained by adding the loss torque to the sign inverted value "Tr×(−1)" of the torque of the reaction force device 70. Therefore, it is considered that the steering wheel 91 is rotating. If NO in S13, it is determined in S16 that "the steering state=middle."

In the case of NO in S11, it is determined in S21 whether the angular velocity ωr (=dθr/dt) of the reaction force device 70 is smaller than a negative angular velocity threshold (−ωth). If YES in S21, the process proceeds to S22. In this case, the steering wheel 91 is turning in the CCW direction in FIG. 1. In S22, it is determined whether the same formula (3) as in S12 is established.

$$|T^*r| \geq |T\_sns|+C \tag{3}$$

If YES in S22, it is determined in S24 that "the steering state=returning." As being interpretable by inverting positive and negative in the right side of FIG. 6, when the torque sensor 94 outputs the positive torque T_sns and the reaction force device 70 outputs the negative torque Tr, the sign inverted value "Tr×(−1)" of the torque of the reaction force device 70 is greater than or equal to a value obtained by adding the loss torque to the torque sensor value T_sns. Therefore, it is considered that the steering wheel 91 is rotating. If NO in S22, it is determined in S23 whether the same formula (4) as in S13 is established.

$$|T\_sns| \geq |T^*r|+C \tag{4}$$

If YES in S23, it is determined in S25 that "the steering state=turning." As being interpretable by inverting positive and negative in the left side of FIG. 6, when the torque sensor 94 outputs the negative torque T_sns and the reaction force device 70 outputs the positive torque Tr, the sign inverted value "T_sns×(−1)" of the torque sensor value is greater than or equal to the value obtained by adding the loss torque to the torque Tr of the reaction force device 70. Therefore, it is considered that the steering wheel 91 is rotating. If NO in S23, it is determined in S26 that "the steering state=middle."

In addition, if NO in S21, that is, if the angular velocity is near 0, it is determined in S29 that "the steering state=holding." As indicated by "return" at the bottom, this turning and returning determination operation is repeatedly executed. Here, the same determinations are repeated for a step group of S12 to S16 and a step group of S22 to S26. Therefore, the angular velocity determining steps of S11 and S21 may be omitted for the purpose of determining the steering state.

Figure 8:
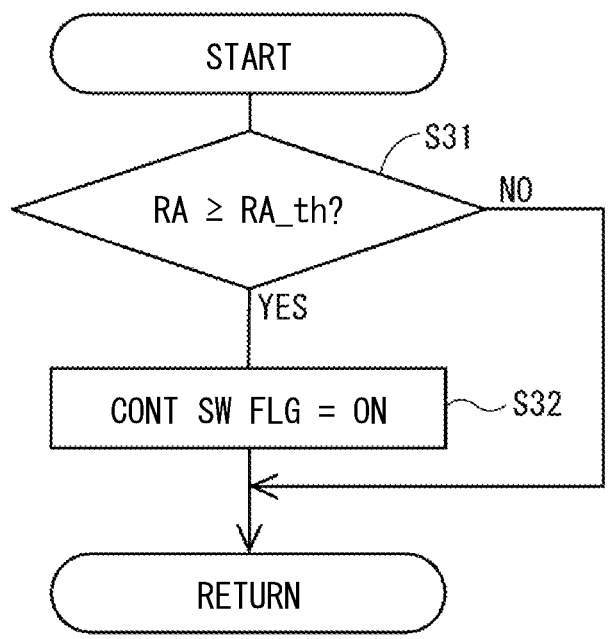
FIG. 8 is a flowchart of a control switching determination operation.

Next, a control switching determination operation by the control switching determination unit 42 will be described with reference to the flowchart in FIG. 8. In S31, the control switching determination unit 42 determines whether the acquired angle ratio RA is equal to or greater than a predetermined angle ratio threshold RA_th. If YES in S31, the control switching flag (CONT SW FLG) is turned on in S32. The control switching flag is notified to the reaction force control unit 510, the viscosity control unit 520, the inertia control unit 530, and the return control unit 540.

In the first embodiment, each of the control units 510, 520, 530, and 540 that has received the control switching flag switches the map between the turning state and the returning state, and sets the characteristic of the corresponding operation to be different between the turning state and the returning state. An example of map switching in the reaction force control unit 510, the viscosity control unit 520, and the inertia control unit 530 will be described with reference to FIG. 9A, FIG. 10A, and FIG. 10B.

Figure 9A:
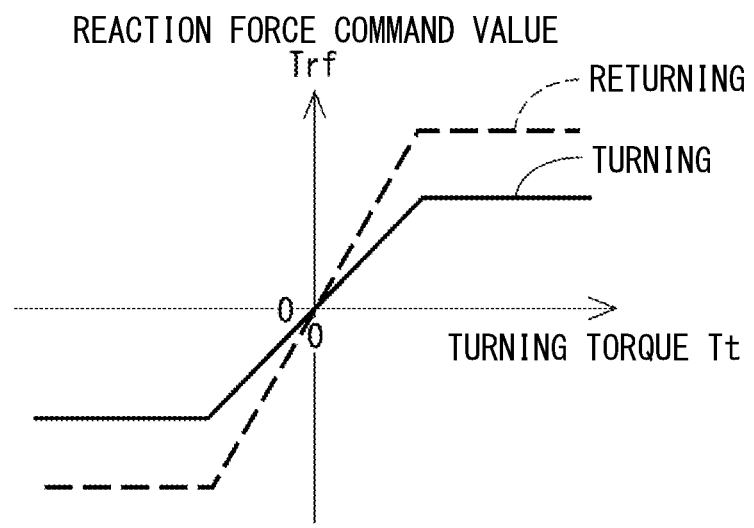
FIG. 9A is a reaction force command value map in FIG. 5.

As shown in FIG. 9A, the reaction force command value map 512 defines the relationship between the torque Tt of the turning device 80 and the reaction force command value Trf. The reaction force command value Trf has a positive correlation with the torque Tt of the turning device 80, and upper and lower limits are guarded. A solid line map is used in the turning state, and a broken line map is used in the returning state. The characteristic in the returning state is set so that the absolute value of the reaction force command value Trf is larger than that in the turning state.

Figure 9B:
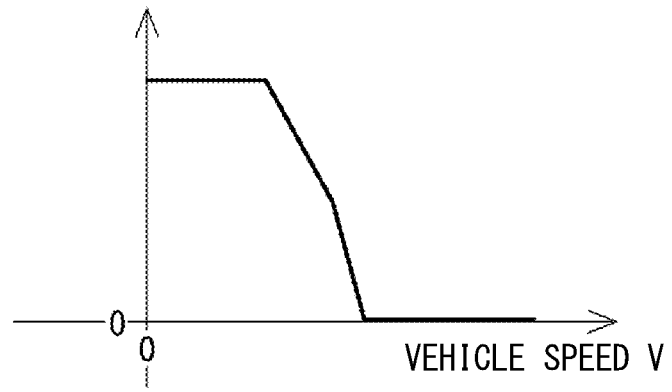
FIG. 9B is a vehicle speed gain map in FIG. 5.

Here, the vehicle speed gain map 514 in FIG. 5 will be described together. As shown in FIG. 9B, the vehicle speed gain map 524 defines the relationship between the vehicle speed V and the vehicle speed gain. The vehicle speed gain is relatively high in a low speed range, decreases with increase of the vehicle speed V in a medium speed range, and becomes zero in a high speed range. The detailed characteristic of the vehicle speed gain map 514 may be the same or different between the turning side and the returning side.

Figure 10A:
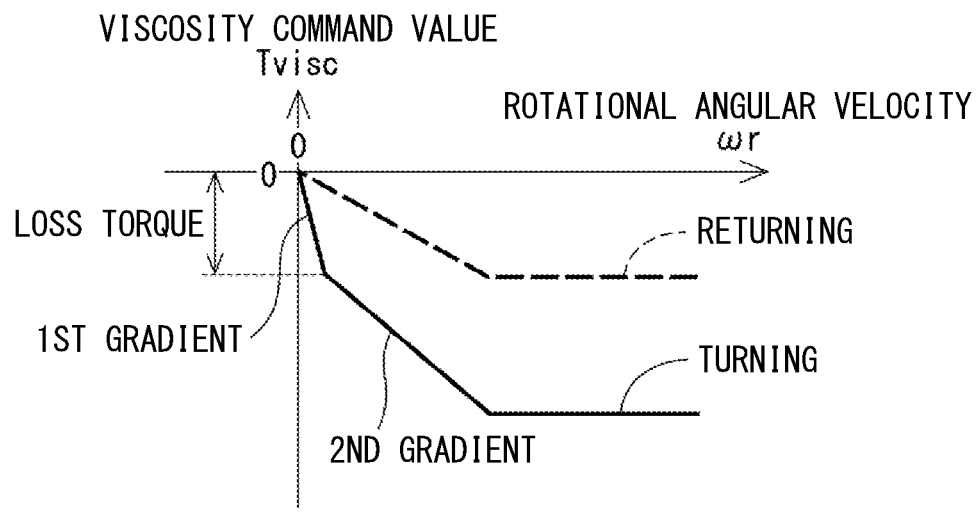
FIG. 10A is a viscosity command value map in FIG. 5.

As shown in FIG. 10A, the viscosity command value map 522 defines the relationship between the rotational angular velocity ωr of the reaction force device 70 and the viscosity command value Tvisc. A solid line map is used in the turning state, and a broken line map is used in the returning state. The characteristic in the returning state is set so that the absolute value of the viscosity command value Tvisc is smaller than that in the turning state. In addition, in the turning state, the map is set so that a torque corresponding to the loss torque that gives a constant torque regardless of the rotational angular velocity ωr is given in order to give the driver a response feeling.

Specifically, the characteristic of the viscosity command value with respect to the rotational angular velocity ωr in the turning state has a two-stage gradient of a first gradient and a second gradient that is gentler than the first gradient. The first gradient is a region in which the rotational angular velocity ωr starts to increase from 0, and defines the viscosity command value Tvisc of a predetermined magnitude corresponding to the loss torque regardless of the rotational angular velocity ωr in order to give the driver the response feeling. The second gradient defines the viscosity command value Tvisc according to the rotational angular velocity ωr. Although FIG. 10A describes that the first gradient is inclined to some extent, the first gradient may be set to be substantially vertical.

Figure 10B:
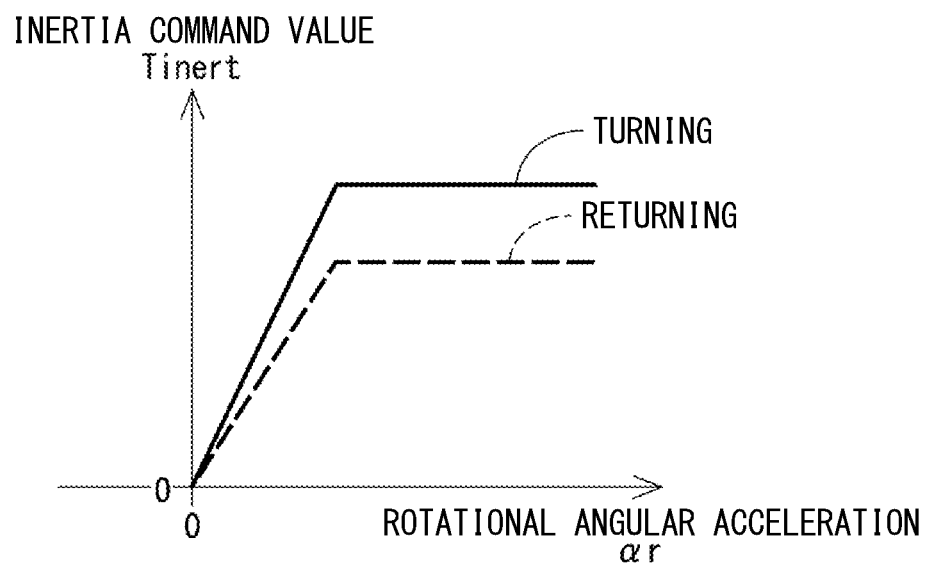
FIG. 10B is an inertia command value map in FIG. 5.

As shown in FIG. 10B, the inertia command value map 532 defines the relationship between the rotational angular acceleration αr of the reaction force device 70 and the inertia command value Tinert. The inertia command value Tinert reduces the sense of inertia of the reaction force device 70. A solid line map is used in the turning state, and a broken line map is used in the returning state. The characteristic in the returning state is set so that the absolute value of the inertia command value Tinert is smaller than that in the turning state.

Next, a binary switching type return control operation by the return control unit 540 of the first embodiment will be described with reference to FIG. 11 and FIGS. 12A to 12C. The return control unit 540 includes turning side operation unit (TOPE) 540F and a returning side operation unit (ROPE) 540R. The turning side operation unit 540F and the returning side operation unit 540R have primary return command value maps (PRCV MAP) 541F and 541R, vehicle speed gain maps (VSG MAP) 542F and 542R, and multipliers 543F and 543R, respectively.

Figure 12A:
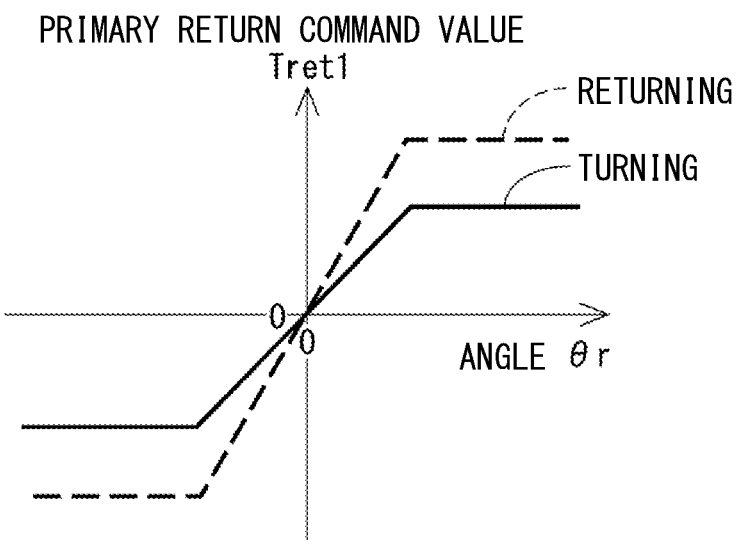
FIG. 12A is a primary return command value map in FIG. 11.

As shown in FIG. 12A, the primary return command value maps 541F and 541R define the relationship between the angle θr of the reaction force device 70 and a primary return command value Tret1. The primary return command value Tret1 has a positive correlation with the angle θr, and upper and lower limits are guarded. The detailed characteristics of the primary return command value maps 541F and 541R may be the same or different between the turning side and the returning side. If they are different, the characteristics on the returning side are set to be larger than the characteristics on the turning side.

Figure 12B:
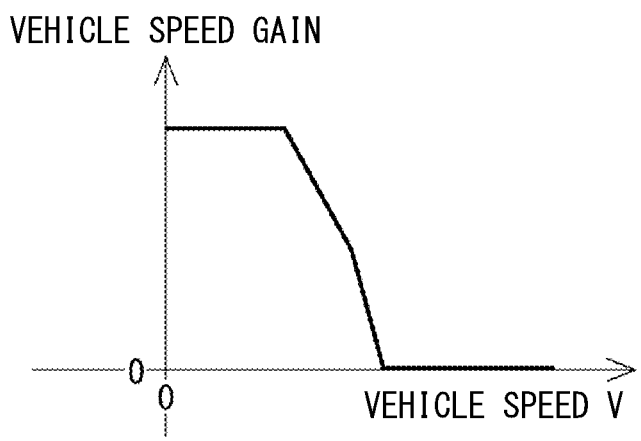
FIG. 12B is a vehicle speed gain map in FIG. 11.

As shown in FIG. 12B, the vehicle speed gain maps 542F and 542R define the relationship between the vehicle speed V and the vehicle speed gain. The vehicle speed gain is relatively high in a low speed range, decreases with increase of the vehicle speed V in a medium speed range, and becomes zero in a high speed range. The detailed characteristics of the vehicle speed gain maps 542F and 542R may be the same or different between the turning side and the returning side.

The multipliers 543F and 543R multiply the primary return command values Tret1(F) and Tret1(R) calculated by the primary return command value maps 541F and 541R by the vehicle speed gain to obtain secondary return command values Tret2(F) and Tret2(R), and output the secondary return command values Tret2(F) and Tret2(R) to a switcher (SW) 546. The switcher 546 selects one of the secondary return command values Tret2(F) and Tret2(R) on the turning side or the returning side based on the determination results of the turning and returning determination unit 410 and the control switching determination unit 42 and outputs the selected one as a tertiary return command value Tret3.

Figure 12C:
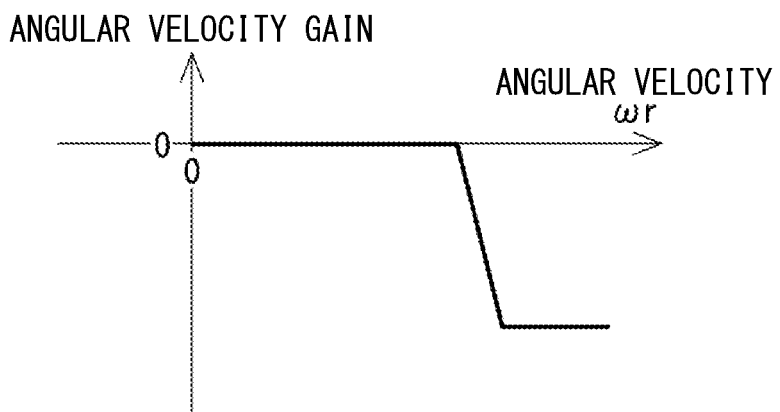
FIG. 12C is an angular velocity gain map in FIG. 11.

As shown in FIG. 12C, an angular velocity gain map (AVG MAP) 547 defines the relationship between the angular velocity ωr of the reaction force device 70 and the angular velocity gain. When the angular velocity ωr is near 0, the angular velocity gain is 0, and when the angular velocity ωr exceeds a predetermined value, the angular velocity gain decreases in the negative direction. The multiplier 548 multiplies the tertiary return command value Tret3 by the angular velocity gain and outputs a final return command value Tret.

Second Embodiment

Next, a turning and returning determination operation according to the second embodiment will be described with reference to FIG. 13 and FIG. 14. In the first embodiment, since the two states of the turning state and the returning state are switched, the characteristics change discontinuously when the steering state is switched. On the other hand, in the second embodiment, the characteristics are switched via the medium state or the holding state by using the state quantity σ that continuously or stepwise indicates the steering state from the turning state to the returning state.

For example, when the state quantity σ is set in the range of 0 to 1, dividing the entire range into a resolution level of an operation unit means "continuously," and dividing into 10 steps by 0.1, for example, means "stepwisely." Strictly speaking, since the resolution level is a finite number, it can be said as "stepwisely," but the maximum number of steps included in "stepwisely" in practical use may be interpreted in light of the common general knowledge in the art.

Figure 13:
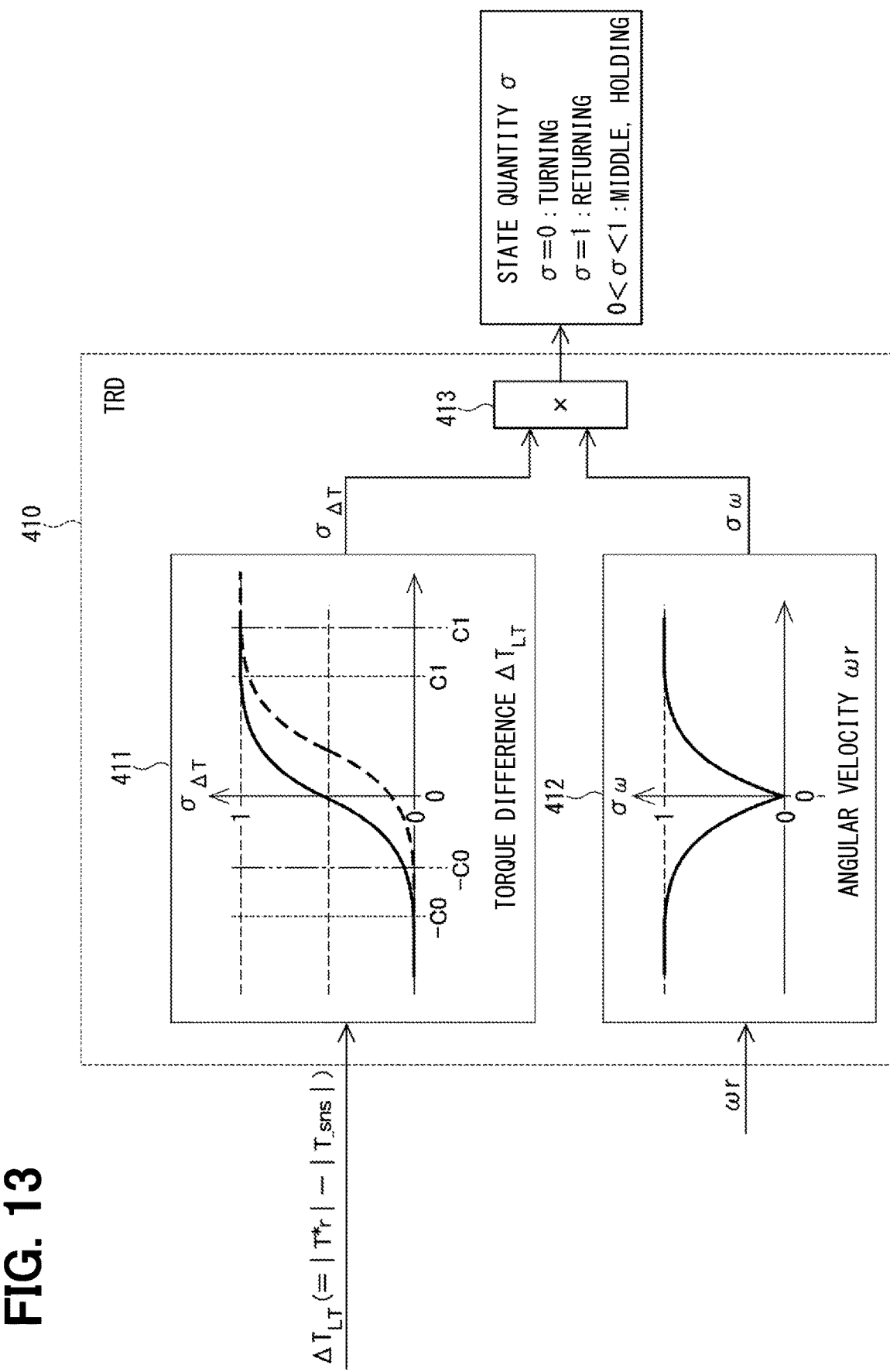
FIG. 13 is a block diagram of a turning and returning determination operation according to the second embodiment.
Figure 14:
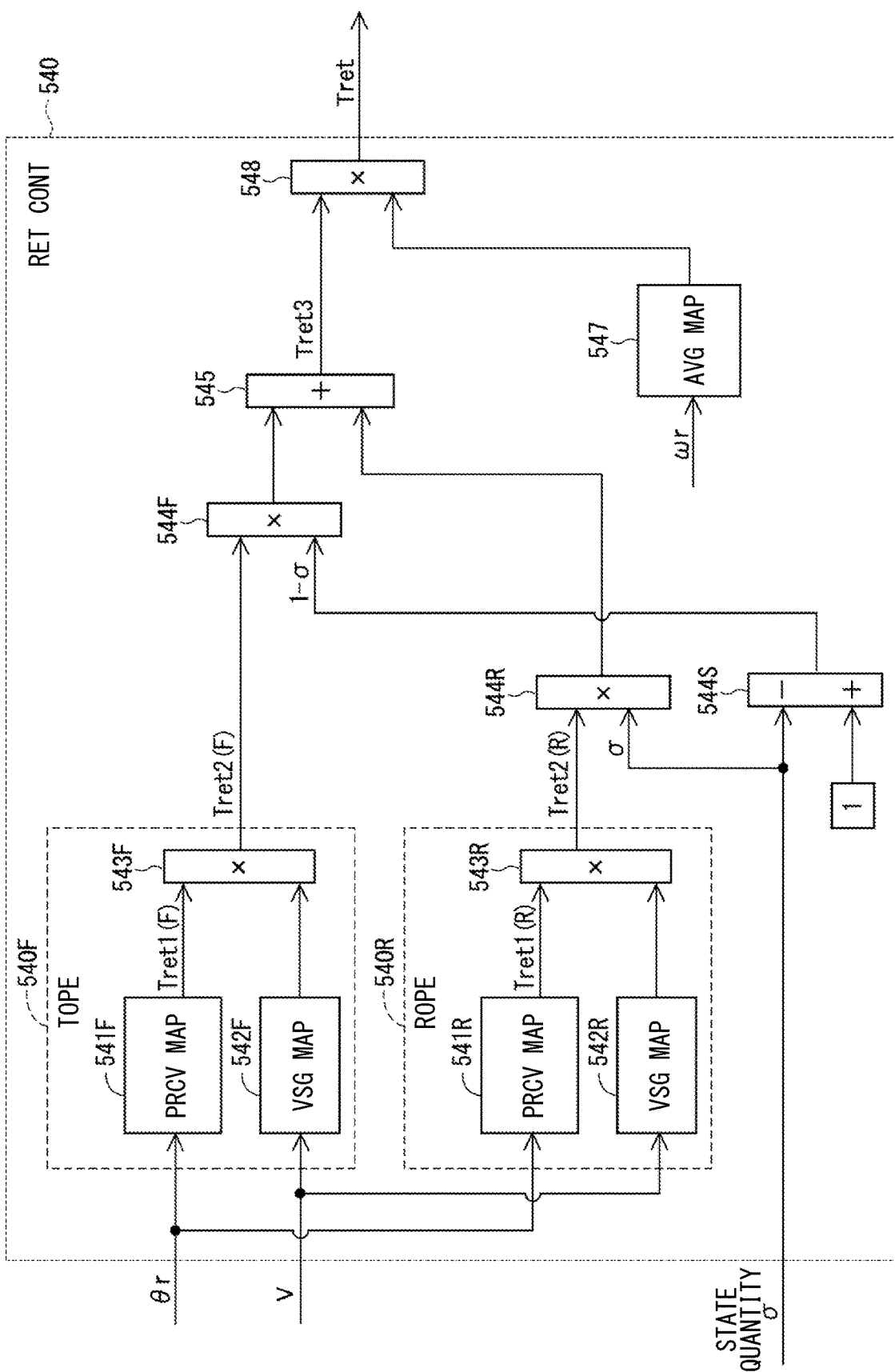
FIG. 14 is a block diagram of a return control operation by a return control unit according to the second embodiment.

As shown in FIG. 13, the turning and returning determination unit 410 of the second embodiment includes a torque difference response quantity map 411, an angular velocity response quantity map 412, and a multiplier 413. The torque difference response quantity map 411 uses the torque difference $\Delta T_{LT}$ (=|T*r|−|T_sns|) as an argument to calculate a torque difference response quantity $\sigma\Delta T$ which is a dimensionless number of 0 to 1. The torque difference response quantity $\sigma\Delta T$ is 0 in a range where the torque difference $\Delta T_{LT}$ is less than a negative critical value (−C0), and the torque difference response quantity $\sigma\Delta T$ is 1 in a range where the torque difference $\Delta T_{LT}$ is greater than or equal to a positive critical value C1. In a range where the torque difference $\Delta T_{LT}$ is from the negative critical value (−C0) to the positive critical value C1, the torque difference response quantity $\sigma\Delta T$ gradually increases from 0 to 1. The characteristic of the torque difference response quantity $\sigma\Delta T$ may be gradually increased around a point of $\Delta T_{LT}=0$ as shown by a solid line. Alternatively, as indicated by a broken line, the characteristic of the torque difference response quantity $\sigma\Delta T$ may be gradually increased around a point shifted to the returning side so that the steering state is less likely to be the returning state.

The angular velocity response quantity map 412 uses the angular velocity $\omega r$ of the reaction force device 70 as an argument to calculate an angular velocity response quantity $\sigma\omega$ which is a dimensionless number of 0 to 1. When the angular velocity $\omega r$ is 0, the angular velocity response quantity $\sigma\omega$ is 0. The angular velocity response quantity $\sigma\omega$ increases and converges to 1 with increase of the absolute value of the angular velocity $\omega r$.

The multiplier 413 multiplies the torque difference response quantity $\sigma\Delta T$ and the angular velocity response quantity $\sigma\omega$ to calculate the state quantity $\sigma$. The state quantity $\sigma$ indicates the turning state when $\sigma=0$ and the returning state when $\sigma=1$. Further, when $0<\sigma<1$, it indicates that steering state is the middle state or the holding state. There is no distinction between the middle state and the holding state as shown in the flowchart of FIG. 7.

As shown in FIG. 5, the state quantity $\sigma$ is output from the turning and returning determination unit 410 to the reaction force control unit 510, the viscosity control unit 520, the inertia control unit 530, and the return control unit 540 via the control switching determination unit 42. Each of the control units 510, 520, 530, and 540 transitions the corresponding map from the turning state to the returning state or from the returning state to the turning state via the middle state or the holding state according to the state quantity $\sigma$.

The transition from the turning state to the returning state based on the state quantity $\sigma$ is realized by, for example, a distribution ratio operation. The return control operation of the distribution ratio operation formula by the return control unit 540 of the second embodiment will be described with reference to FIG. 14. The return control unit 540 of the second embodiment is different from the configuration of the first embodiment shown in FIG. 11 in that the switcher 547 is replaced by a state quantity inverter 544S, distribution ratio multipliers 544F, 544R, and a distribution value adder 545. The rest of the configuration is the same as that of FIG. 11, so the description thereof will be omitted.

The state quantity inverter 544S calculates a state quantity inverted value (1−σ) by subtracting the state quantity σ from "1." The state quantity inverted value (1−σ) indicates that the steering state is the returning state when (1−σ)=0 and the steering state is the turning state when (1−σ)=1. The distribution ratio multiplier 544F on the turning side multiplies the secondary return command value Tret2(F) by the state quantity inverted value (1−σ). The distribution ratio multiplier 544R on the returning side multiplies the secondary return command value Tret2(R) by the state quantity σ.

The distribution value adder 545 adds the output of the distribution ratio multiplier 544F on the turning side and the output of the distribution ratio multiplier 544R on the returning side to calculate the tertiary return command value Tret3. When the state quantity σ is σ=0 or σ=1, the configuration of FIG. 14 is substantially the same as the configuration of FIG. 11. However, when 0<σ<1, the tertiary return command value Tret3 changes continuously or stepwisely according to the distribution ratio of the middle state or the holding state. Therefore, it is possible to restrict the characteristic of the return amount operation from changing discontinuously when the steering state is switched.

Third Embodiment

Next, a steering control apparatus 203 according to a third embodiment will be described with reference to FIGS. 15 to 18B. As shown in FIG. 15, the steering control apparatus 203 according to the third embodiment is different from the steering control apparatus 201 according to the first and second embodiments shown in FIG. 5 in that the control switching determination unit 42 is replaced by a first correction operation unit (1ST CORR) 431, a second correction operation unit (2ND CORR) 432, a third correction operation unit (3RD CORR) 434, and a fourth correction operation unit (4TH CORR) 434. Further, the configuration shown in FIG. 13 in which the turning and returning determination unit 410 calculates the state quantity a is commonly used.

The first to fourth correction operation units 431 to 434 respectively calculate first to fourth correction coefficients k1 to k4 corresponding to the reaction force control unit 510, the viscosity control unit 520, the inertia control unit 530 and the return control unit 540 based on the angle ratio RA and the state quantity a calculated by the turning and returning determination unit 410. The reaction force control unit 510, the viscosity control unit 520, the inertia control unit 530, and the return control unit 540 have correction coefficient multipliers 513, 523, 533, and 549, respectively.

The correction coefficient multipliers 513, 523, and 533 of the reaction force control unit 510, the viscosity control unit 520, and the inertia control unit 530 respectively multiply the reaction force command value Trf, the viscosity command value Tvisc, and the inertia command value Tinert before the correction calculated by the maps 512, 522, and 532 by the first to third correction coefficients k1 to k3. Regarding the return control unit 540, a part excluding the correction coefficient multiplier 549 will be referred to as "a return command value operation unit (RCV OPE) 5410." The return control unit 540 of FIG. 11 or FIG. 14 corresponds to the return command value operation unit 5410. The correction coefficient multiplier 549 multiplies the return command value Tret before the correction calculated by the return command value operation unit 5410 by the fourth correction coefficient k4.

Figure 16A:
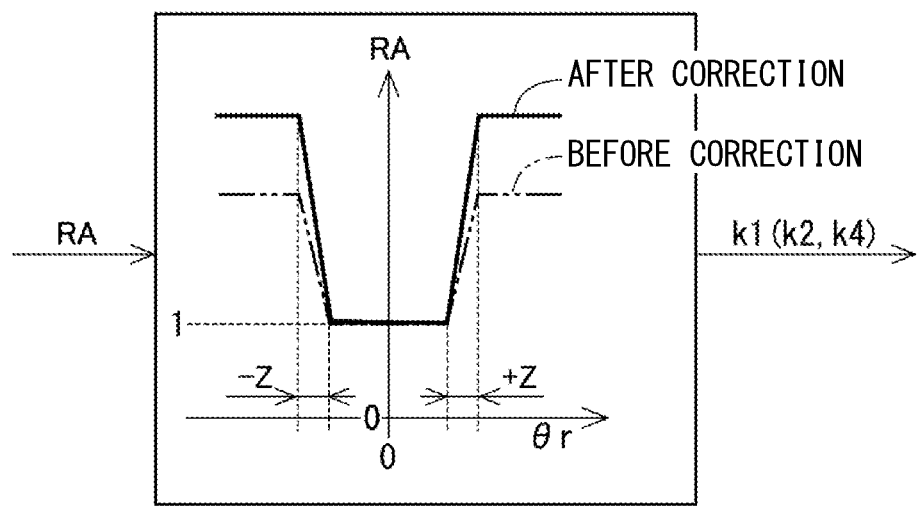
FIG. 16A is each of first, second, and fourth correction operation maps in FIG. 15.

FIG. 16A shows a map of the first correction operation corresponding to the reaction force control unit 510. A dashed double-dotted line is the turning angle response map 321 of the angle ratio control unit 320 shown in FIG. 3, and shows the angle ratio characteristic before the correction, that is, before control switching. The solid line shows the angle ratio characteristic after the correction, that is, after control switching. In the maps before and after the correction, a predetermined angle region (±Z) in which the angle RA increases from the minimum value 1 to the maximum value is common.

Here, the first correction coefficient k1 is determined by a ratio of the angle ratio RA change rate before and after the correction in the predetermined angle region (±Z). For example, when the characteristic before the correction corresponds to the turning state and the characteristic after the correction corresponds to the returning state, the angle ratio change rate after the correction is set to be larger than the angle ratio change rate before the correction. Therefore, the first correction coefficient k1 becomes a value larger than 1. Similar maps are used for the second correction operation corresponding to the viscosity control unit 520 and the fourth correction operation corresponding to the return control unit 540. The first correction calculation, the second correction calculation, and the fourth correction calculation may have different ratios of the angle ratio change rates before and after the correction.

Figure 16B:
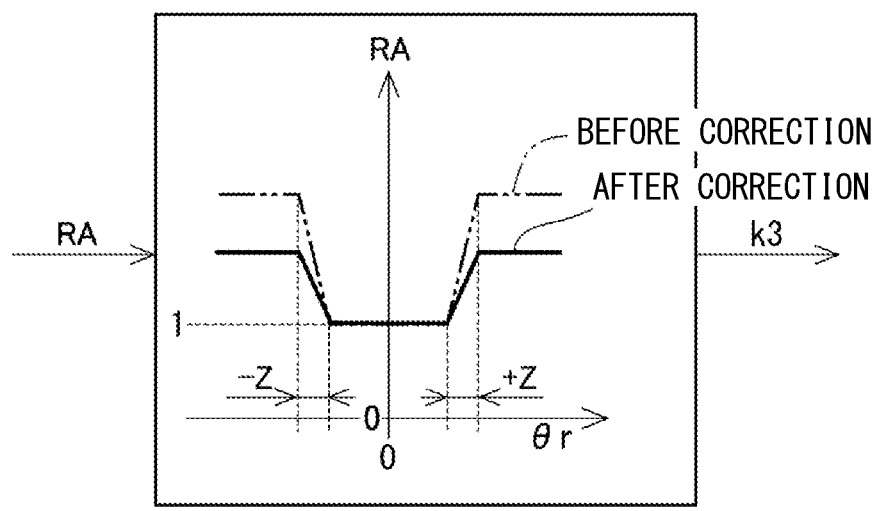
FIG. 16B is a third correction operation map in FIG. 15.

FIG. 16B shows a map of the third correction operation corresponding to the inertia control unit 530. Similarly to the above, a dashed double-dotted line is the angle ratio map of the angle ratio control unit 320 shown in FIG. 3 and shows the angle ratio characteristic before the correction, that is, before control switching. The solid line shows the characteristic after the correction. In the maps before and after the correction, the predetermined angle region (±Z) in which the angle ratio increases from the minimum value 1 to the maximum value is common.

Here, the third correction coefficient k3 is determined by the ratio of the change rates of the angle ratio RA before and after the correction in the predetermined angle region (±Z). For example, when the characteristic before the correction corresponds to the turning state and the characteristic after the correction corresponds to the returning state, the angle ratio change rate after the correction is set to be smaller than the angle ratio change rate before the correction. Therefore, the third correction coefficient k3 becomes a value smaller than 1.

Figure 17:
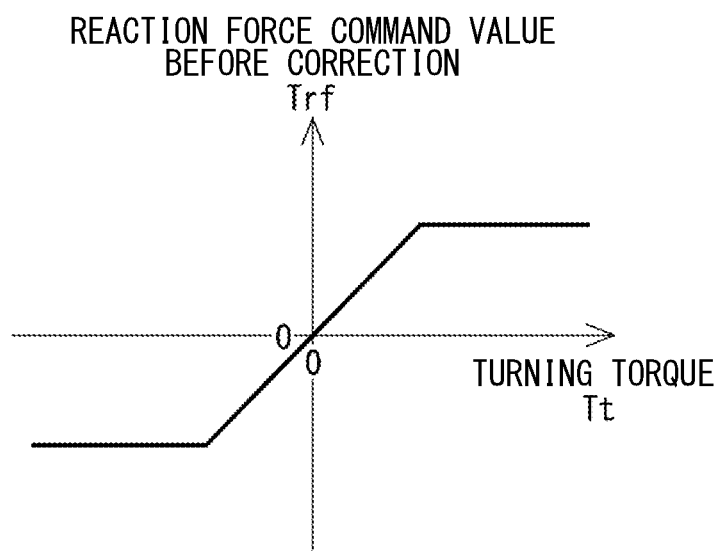
FIG. 17 is a reaction force command value in FIG. 15.
Figure 18A:
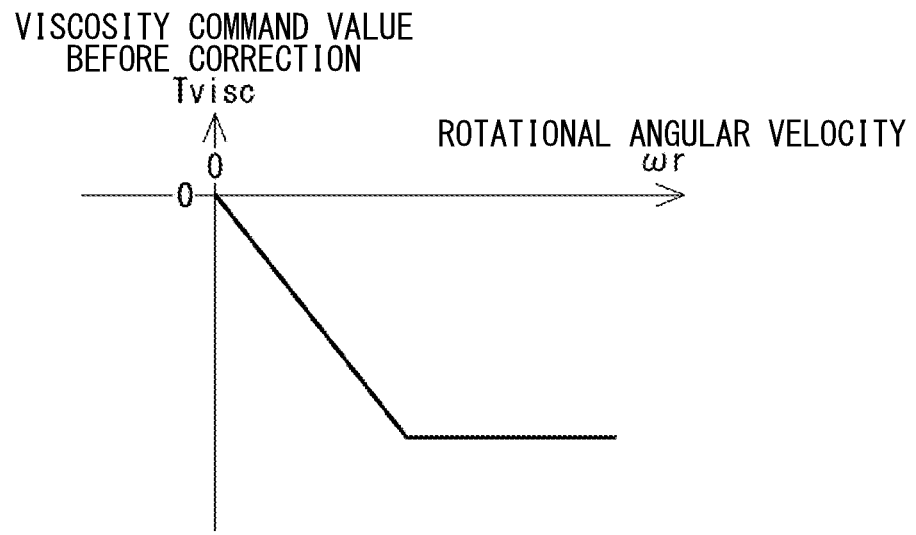
FIG. 18A is a viscosity command value map in FIG. 15.
Figure 18B:
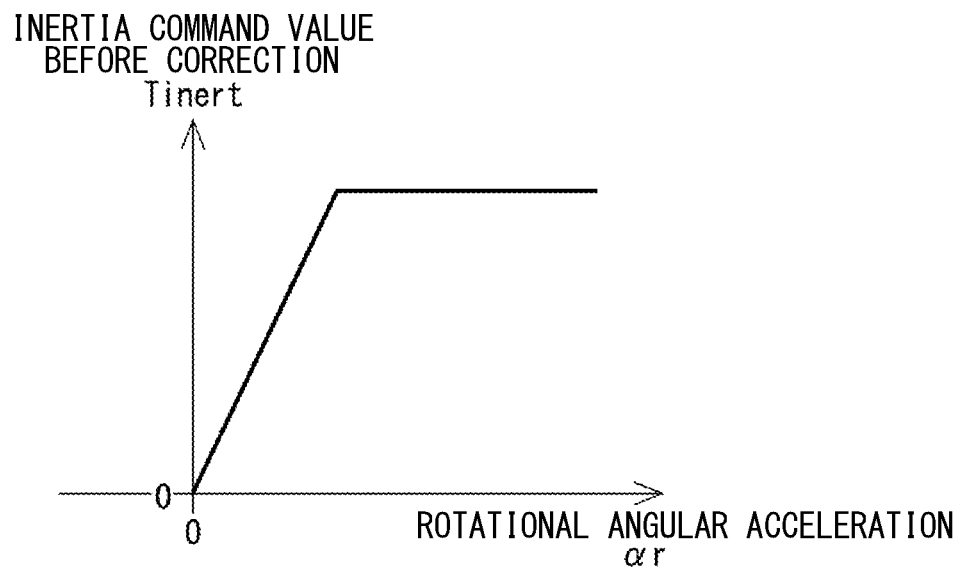
FIG. 18B is an inertia command value map in FIG. 15.

The reaction force command value map of FIG. 17, the viscosity command value map of FIG. 18A, and the inertia command value map of FIG. 18B correspond to the maps of FIG. 9A, FIG. 10A, and FIG. 10B, respectively, and the vertical axes respectively represent the reaction force command value Trf, the viscosity command value Tvisc, and the inertia command value Tinert before the correction. For example, when the characteristic before the correction corresponds to the turning state, the maps of FIG. 17 and FIG. 18B correspond to the solid lines of the maps of FIG. 9A and FIG. 10B, respectively. Regarding the viscosity command value Tvisc, while the solid line of the map of FIG. 10A has the two-step gradient, the map of FIG. 18A does not have a two-step gradient. However, the map of FIG. 18A mat have a two-step gradient as shown in FIG. 10A.

Operation and Effect of the Present Embodiment (1) In the present embodiment, the turning state and the returning state can be determined based on the reaction force command value T*r and the detection value T_sns of the torque sensor by utilizing the fact that the reaction force device 70 in the steer-by-wire system 90 is controlled with two inputs of the driver's steering torque and the motor torque, and there is the loss torque of the gear and the motor. Accordingly, since the determination is made only by the torque, it is possible to determine turning or returning before an actual angle change occurs in contrast with a case where a speed is used.

Further, the influence of electric loss can be avoided as compared with a case where the turning state and the returning state are determined by the power running and regeneration of the rotary electric machine. Then, the steering feeling can be appropriately adjusted by making the characteristics of the reaction force amount operation, the viscosity amount operation, the inertial amount operation, and the return amount operation differ between the turning state and the returning state. Specifically, when turning, parameters such as the loss torque and the viscosity that generate the response feeling are increased, and when returning, the amount of return control for emphasizing the reaction force from the road surface or SAT is increased.

(2) The reaction force control unit 510, the viscosity control unit 520, the inertia control unit 530, and the return control unit 540 respectively calculate the reaction force command value Trf, the viscosity command value Tvisc, the inertia command value, and the return command value Tret using maps that define the characteristics of outputs with respect to inputs. Each of the control units 510, 520, 530, and 540 may calculate the command value using, for example, a mathematical formula, but using the map can reduce the load of operation processing.

(3) In the second and third embodiments, the turning and returning determination unit 410 determines "the state quantity σ that indicates the steering state from the turning state to the returning state continuously or stepwisely" based on the reaction force torque command value T*r and the detection value T_sns of the torque sensor 94. Then, in the second embodiment, the reaction force control unit 510, the viscosity control unit 520, the inertia control unit 530, and the return control unit 540 make corresponding maps transition according to the state quantity σ. As a result, the characteristic changes continuously or stepwisely when the steering state is switched, so that a smooth steering feeling can be obtained.

(4) The characteristic of the viscosity command value with respect to the rotational angular velocity ωr in the turning state has the two-stage gradient of the first gradient and the second gradient that is gentler than the first gradient. The first gradient is the region in which the rotational angular velocity ωr starts to increase from 0, and defines the viscosity command value Tvisc of a predetermined magnitude corresponding to the loss torque regardless of the rotational angular velocity ωr in order to give the driver the response feeling. Accordingly, a steering feeling that increases a viscous feeling can be generated when turning.

(5) In the third embodiment, the reaction force control unit 510, the viscosity control unit 520, the inertia control unit 530, and the return control unit 540 change the corresponding characteristics by multiplying the correction coefficients k1 to k4 calculated according to the state quantity σ. Thereby, the same effect as in the second embodiment can be provided. Further, by using the correction coefficients k1 to k4 with fixing the maps, it is possible to reduce the processing load due to the switching of the maps.

(6) The angle ratio control unit 320 changes "the angle ratio RA of the angle θt of the turning device 80 to the angle θr of the reaction force device 70" in the predetermined angle region ±Z of the angle θr of the reaction force device 70 according to the angle θr of the reaction force device 70. Then, the correction coefficients k1 to k4 of the third embodiment are determined by "the ratio of change rates of the angle ratio RA" before and after the correction in the predetermined angle region ±Z. Thereby, the correction coefficients k1 to k4 can be rationally determined based on the angle ratio RA.

Figure 2:
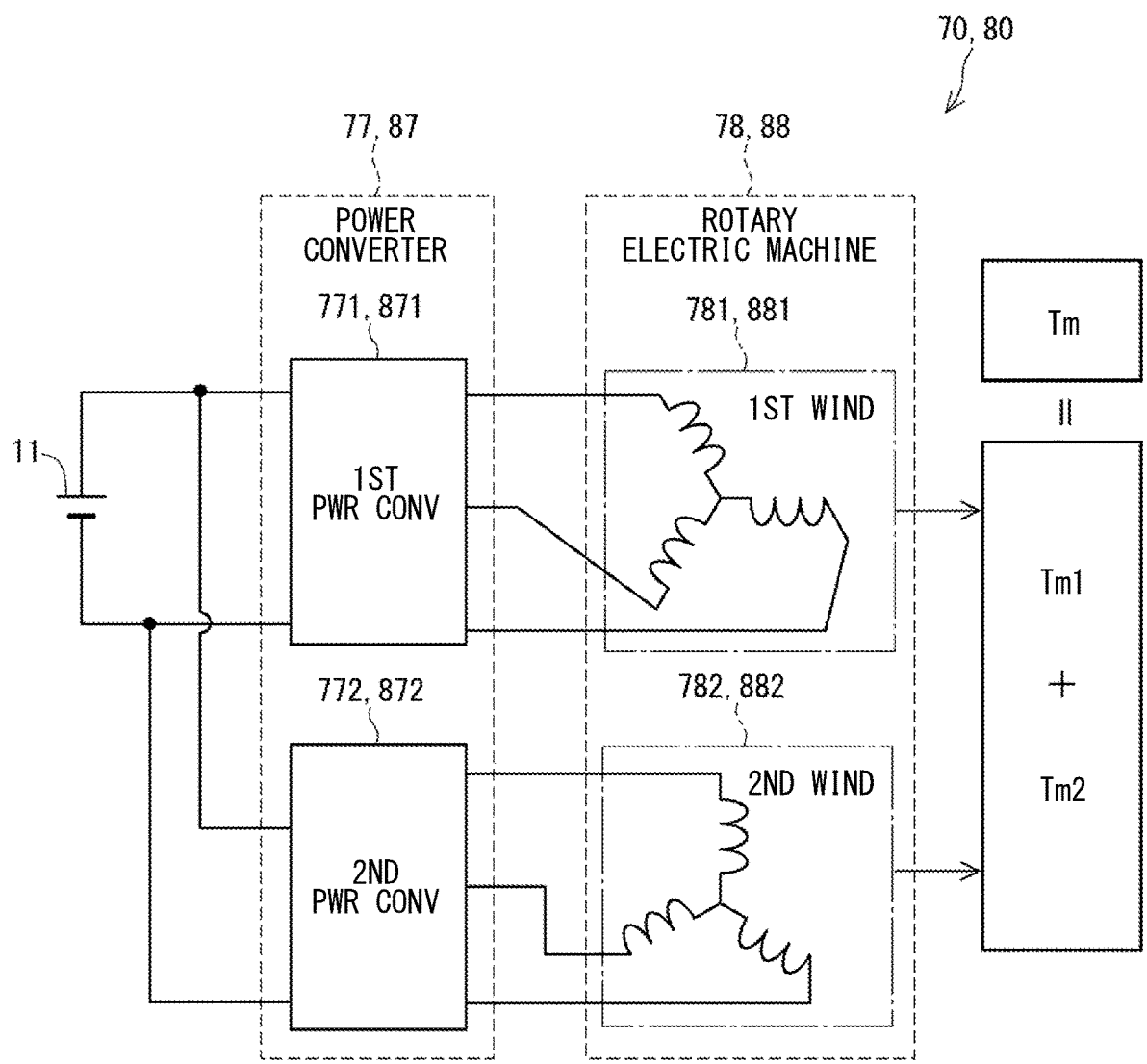
FIG. 2 is a diagram showing a schematic configuration of a reaction force device and a turning device of two systems.

(7) As shown in FIG. 2, in the present embodiment, the reaction force device 70 and the turning device 80 are redundantly configured with two systems, so even if one system fails, the reaction force device 70 and the turning device 80 can be continuously driven by the other normal system. Therefore, the reliability is improved.

Other Embodiments (a) The steering control apparatus 200 is not limited to the electromechanical integrated type configuration as shown in FIG. 1, and the control units 270 and 280 and the power converters 77 and 87 may be arranged separately from the rotary electric machines 78 and 88. In such a case, the two control units 270 and 280 may be configured as an integrated steering control apparatus 200 without being physically separated from each other. Alternatively, one of the reaction force device 70 and the turning device 80 may be configured as an electromechanical integrated type that includes an overall control unit, and may transmit and receive signals to and from the other device.

(b) The inertia control unit 530 may not be provided in the reaction force device control unit 270 of the steering control apparatus 200. In that case, the adder 553 in FIG. 4, FIG. 5, and FIG. 15 is unnecessary, and the target value T**r_st of the steering wheel torque control unit 620 is a value obtained by adding the viscosity command value Tvisc and the return command value Tret to the steering torque command value T*st. Further, the third correction operation unit 433 in FIG. 15 is also unnecessary.

(c) In the present embodiment, "the physical quantity corresponding to X" used to calculate each quantity includes various types of physical quantity that can be uniquely converted to X by multiplication or division of coefficients or calculus in addition to the representative physical quantity X. For example, the physical quantity corresponding to the rotational angular velocity ωr ([deg/s]) of the reaction force device 70 includes the rotational speed [rpm] of the reaction force rotary electric machine 78, and the rotation speed of each part connected to the output axis of the reaction force rotary electric machine 78 via the reaction force reducer 79.

The present disclosure should not be limited to the embodiments described above. Various other embodiments may be implemented without departing from the scope of the present disclosure.

The control apparatus and the technique according to the present disclosure may be achieved by a dedicated computer provided by constituting a processor and a memory programmed to execute one or more functions embodied by a computer program. Alternatively, the control apparatus and the technique according to the present disclosure may be achieved by a dedicated computer provided by constituting a processor with one or more dedicated hardware logic circuits. Alternatively, the control apparatus and the technique according to the present disclosure may be achieved using one or more dedicated computers constituted by a combination of the processor and the memory programmed to execute one or more functions and the processor with one or more hardware logic circuits. The computer program may also be stored on a computer-readable non-transitory tangible recording medium as instructions to be executed by a computer.

What is claimed is:

1. A steering control apparatus for controlling a reaction force device and a turning device in a steer-by-wire system, the steer-by-wire system including:
the reaction force device connected to a steering wheel and including a reaction force rotary electric machine, a reaction force power converter configured to drive the reaction force rotary electric machine, and a reaction force reducer configured to reduce an output of the reaction force rotary electric machine;
the turning device configured to turn a wheel and including a turning rotary electric machine, a turning power converter configured to drive the turning rotary electric machine, and a turning reducer configured to reduce an output of the turning rotary electric machine; and
a torque sensor configured to detect a steering input by a driver, the steering control apparatus comprising:
a reaction force control unit configured to calculate a reaction force command value of the reaction force device by a reaction force amount operation based on a physical quantity corresponding to an output torque of the turning device, and configured to calculate a steering torque command value based on the reaction force command value;
a viscosity control unit configured to calculate a viscosity command value of the reaction force device by a viscosity amount operation based on a physical quantity corresponding to a rotational angular velocity of the reaction force device;
a return control unit configured to calculate a return command value of the reaction force device based on a return amount operation based on a physical quantity corresponding to an angle of the reaction force device and a physical quantity corresponding to a vehicle speed;
a steering wheel torque control unit configured to calculate a torque command value of the reaction force rotary electric machine so that a detection value of the torque sensor follows a target value obtained by adding at least the viscosity command value and the return command value to the steering torque command value;
a reaction force device current control unit configured to control an electric current that flows to the reaction force rotary electric machine based on the torque command value of the reaction force rotary electric machine;
a turning and returning determination unit configured to determine that a steering state is a returning state in which the steering wheel is returned by the driver in response to a difference between a physical quantity corresponding to an output torque of the reaction force device and an absolute value of the detection value of the torque sensor being greater than or equal to a predetermined value, the predetermined value is set to a value corresponding to a loss torque generated in the reaction force rotary electric machine and the reaction force reducer, and
determine that the steering state is a turning state in which the steering wheel is turned by the driver in response to the difference between the physical quantity corresponding to the output torque of the reaction force device and the absolute value of the detection value of the torque sensor being less than the predetermined value,
wherein the turning and returning determination unit is configured to determine the steering state based on an interrelationship between the physical quantity corresponding to the output torque of the reaction force device and the absolute value of the detection value of the torque sensor without using a steering angle, wherein the physical quantity corresponding to the output torque of the reaction force device is an absolute value of one of the torque command value of the reaction force rotary electric machine, an output torque of the reaction force rotary electric machine, a current command value of the reaction force rotary electric machine, or a current that flows through the reaction force rotary electric machine, and wherein one or more of the reaction force control unit, the viscosity control unit, and the return control unit are configured to make characteristics of corresponding one or more of the reaction force amount operation, the viscosity amount operation, and the return amount operation differ between the turning state and the returning state.

2. The steering control apparatus according to claim 1, wherein the reaction force control unit, the viscosity control unit, and the return control unit are configured to calculate the reaction force command value, the viscosity command value, and the return command value, respectively, using maps that define characteristics of outputs with respect to inputs.

3. The steering control apparatus according to claim 2, wherein the turning and returning determination unit is configured to calculate a state quantity that defines the steering state from the turning state to the returning state continuously or stepwisely based on the physical quantity corresponding to the output torque of the reaction force device and the detection value of the torque sensor, and the one or more of the reaction force control unit, the viscosity control unit, and the return control unit are configured to make corresponding one or more of the maps transition according to the state quantity.

4. The steering control apparatus according to claim 2, wherein the characteristic of the viscosity command value with respect to the physical quantity corresponding to the rotational angular velocity of the reaction force device has a two-stage gradient of a first gradient and a second gradient that is gentler than the first gradient, the first gradient is a region in which the physical quantity corresponding to the rotational angular velocity of the reaction force device starts to increase from 0, and defines the viscosity command value of a predetermined magnitude regardless of a magnitude of the physical quantity corresponding to the rotational angular velocity of the reaction force device in order to give the driver a response feeling, and the second gradient defines the viscosity command value according to the physical quantity corresponding to the rotational angular velocity of the reaction force device.

5. The steering control apparatus according to claim 1, wherein the turning and returning determination device is configured to calculate a state quantity that defines the steering state from the turning state to the returning state continuously or stepwisely based on the physical quantity corresponding to the output torque of the reaction force device and the detection value of the torque sensor, and the one or more of the reaction force control unit, the viscosity control unit, and the return control unit are configured to change the characteristics of the corresponding one or more of the reaction force amount operation, the viscosity amount operation, and the return amount operation by multiplying a correction coefficient calculated according to the state quantity.

6. The steering control apparatus according to claim 5, further comprising an angle ratio control unit configured to change an angle ratio of an angle of the turning device with respect to an angle of the reaction force device in a predetermined angle region of the angle of the reaction force device, wherein the correction coefficient is determined based on a ratio of change rates of the angle ratio before and after a correction in the predetermined angle region.

7. The steering control apparatus according to claim 1, wherein at least one of the reaction force device and the turning device includes:

a rotary electric machine working as the reaction force rotary electric machine or the turning rotary electric machine, having windings of two systems, and configured to output a torque obtained by adding torques of the two systems; and power converters of two systems working as the reaction force power converter or the turning power converter, and configured to energize the windings of the two systems, respectively.

8. A steering control apparatus for controlling a reaction force device and a turning device in a steer-by-wire system, the steer-by-wire system including:

the reaction force device connected to a steering wheel, and including a reaction force rotary electric machine, a reaction force power converter configured to drive the reaction force rotary electric machine, and a reaction force reducer configured to reduce an output of the reaction force rotary electric machine;

the turning device configured to turn a wheel, and including a turning rotary electric machine, a turning power converter configured to drive the turning rotary electric machine, and a turning reducer configured to reduce an output of the turning rotary electric machine; and a torque sensor configured to detect a steering input by a driver, wherein the steering control apparatus comprising a processor and a memory, the memory storing a program configured to, when executed by the processor, cause the processor to:

calculate a reaction force command value of the reaction force device by a reaction force amount operation based on a physical quantity corresponding to an output torque of the turning device, and calculate a steering torque command value based on the reaction force command value;

calculate a viscosity command value of the reaction force device by a viscosity amount operation based on a physical quantity corresponding to a rotational angular velocity of the reaction force device;

calculate a return command value of the reaction force device based on a return amount operation based on a physical quantity corresponding to an angle of the reaction force device and a physical quantity corresponding to a vehicle speed;

calculate a torque command value of the reaction force rotary electric machine so that a detection value of the torque sensor follows a target value obtained by adding at least the viscosity command value and the return command value to the steering torque command value;

control an electric current that flows to the reaction force rotary electric machine based on the torque command value of the reaction force rotary electric machine;

determine that a steering state is a returning state in which the steering wheel is returned by the driver in response to a difference between a physical quantity corresponding to an output torque of the reaction force device and an absolute value of the detection value of the torque sensor being greater than or equal to a predetermined value, the predetermined value is set to a value corresponding to a loss torque generated in the reaction force rotary electric machine and the reaction force reducer, and determine that the steering state is a turning state in which the steering wheel is turned by the driver in response to the difference between the physical quantity corresponding to the output torque of the reaction force device and the absolute value of the detection value of the torque sensor being less than the predetermined value; and make characteristics of one or more of the reaction force amount operation, the viscosity amount operation, and the return amount operation differ between the turning state and the returning state, wherein the steering state is determined based on an interrelationship between the physical quantity corresponding to the output torque of the reaction force device and the absolute value of the detection value of the torque sensor without using a steering angle, and wherein the physical quantity corresponding to the output torque of the reaction force device is an absolute value of one of the torque command value of the reaction force rotary electric machine, an output torque of the reaction force rotary electric machine, a current command value of the reaction force rotary electric machine, or a current that flows through the reaction force rotary electric machine.

9. A steering control method for controlling a reaction force device and a turning device in a steer-by-wire system, the steer-by-wire system including:

the reaction force device connected to a steering wheel, and including a reaction force rotary electric machine, a reaction force power converter configured to drive the reaction force rotary electric machine, and a reaction force reducer configured to reduce an output of the reaction force rotary electric machine;

the turning device configured to turn a wheel, and including a turning rotary electric machine, a turning power converter configured to drive the turning rotary electric machine, and a turning reducer configured to reduce an output of the turning rotary electric machine; and a torque sensor configured to detect a steering input by a driver, the steering control method comprising:

calculating a reaction force command value of the reaction force device by a reaction force amount operation based on a physical quantity corresponding to an output torque of the turning device, and calculating a steering torque command value based on the reaction force command value;

calculating a viscosity command value of the reaction force device by a viscosity amount operation based on a physical quantity corresponding to a rotational angular velocity of the reaction force device;

calculating a return command value of the reaction force device based on a return amount operation based on a physical quantity corresponding to an angle of the reaction force device and a physical quantity corresponding to a vehicle speed;

calculating a torque command value of the reaction force rotary electric machine so that a detection value of the torque sensor follows a target value obtained by adding at least the viscosity command value and the return command value to the steering torque command value;

controlling an electric current that flows to the reaction force rotary electric machine based on the torque command value of the reaction force rotary electric machine;

determining that a steering state is a returning state in which the steering wheel is returned by the driver in response to a difference between a physical quantity corresponding to an output torque of the reaction force device and an absolute value of the detection value of the torque sensor being greater than or equal to a predetermined value, the predetermined value is set to a value corresponding to a loss torque generated in the reaction force rotary electric machine and the reaction force reducer, and determining that the steering state is a turning state in which the steering wheel is turned by the driver in response to the difference between the physical quantity corresponding to the output torque of the reaction force device and the absolute value of the detection value of the torque sensor being less than the predetermined value; and making characteristics of one or more of the reaction force amount operation, the viscosity amount operation, and the return amount operation differ between the turning state and the returning state, wherein the steering state is determined based on an interrelationship between the physical quantity corresponding to the output torque of the reaction force device and the absolute value of the detection value of the torque sensor without using a steering angle, and wherein the physical quantity corresponding to the output torque of the reaction force device is an absolute value of one of the torque command value of the reaction force rotary electric machine, an output torque of the reaction force rotary electric machine, a current command value of the reaction force rotary electric machine, or a current that flows through the reaction force rotary electric machine.

10. The steering control apparatus according to claim 1, wherein the viscosity control unit, and the return control unit are respectively configured to make characteristics of the viscosity amount operation, and the return amount operation differ between the turning state and the returning state.

11. The steering control apparatus according to claim 8, wherein characteristics of the viscosity amount operation and the return amount operation are made to differ between the turning state and the returning state.

12. The steering control method according to claim 9, wherein characteristics of the viscosity amount operation and the return amount operation are made to differ between the turning state and the returning state.

13. The steering control apparatus according to claim 1, wherein the reaction force device is not rotationally connected to the wheel of a vehicle such that rotation of the reaction force device does not physically rotate the wheel of the vehicle, and the turning device is not rotationally connected to the steering wheel of the vehicle such that rotation of the turning device does not physically rotate the steering wheel of the vehicle.

14. The steering control apparatus according to claim 8, wherein
the reaction force device is not rotationally connected to the wheel of a vehicle such that rotation of the reaction force device does not physically rotate the wheel of the vehicle, and
the turning device is not rotationally connected to the steering wheel of the vehicle such that rotation of the turning device does not physically rotate the steering wheel of the vehicle.

15. The steering control method according to claim 9, wherein
the reaction force device is not rotationally connected to the wheel of a vehicle such that rotation of the reaction force device does not physically rotate the wheel of the vehicle, and
the turning device is not rotationally connected to the steering wheel of the vehicle such that rotation of the turning device does not physically rotate the steering wheel of the vehicle.

16. The steering control apparatus according to claim 1, wherein
the turning and returning determination unit configured to
determine a torque difference between the output torque of the reaction force device and a steering torque of the driver, the output torque of the reaction force device corresponding to a physical quantity corresponding to the output torque of the reaction force device, the steering torque of the driver corresponding to a detection value of the torque sensor,
determine whether the steering state is the returning state or the turning state by comparing the torque difference between the output torque of the reaction force device and the steering torque of the driver to the predetermined value, the returning state being a state in which the steering wheel is returned by the driver, the turning state being a state in which the steering wheel is turned by the driver,
determine that the steering state is the returning state in response to the torque difference between the output torque of the reaction force device and the steering torque of the driver being greater than or equal to the predetermined value, and
determine that the steering state is the turning state in response to the torque difference between the output torque of the reaction force device and the steering torque of the driver being less than the predetermined value.

17. The steering control apparatus according to claim 8, wherein
the program, when executed by the processor, further causes the processor to:
determine a torque difference between the output torque of the reaction force device and a steering torque of the driver, the output torque of the reaction force device corresponding to a physical quantity corresponding to the output torque of the reaction force device, the steering torque of the driver corresponding to a detection value of the torque sensor,
determine whether the steering state is the returning state or the turning state by comparing the torque difference between the output torque of the reaction force device and the steering torque of the driver to the predetermined value, the returning state being a state in which the steering wheel is returned by the driver, the turning state being a state in which the steering wheel is turned by the driver,
determine that the steering state is the returning state in response to the torque difference between the output torque of the reaction force device and the steering torque of the driver being greater than or equal to the predetermined value, and
determine that the steering state is the turning state in response to the torque difference between the output torque of the reaction force device and the steering torque of the driver being less than the predetermined value.

18. The steering control method according to claim 9, further comprising:
determining a torque difference between the output torque of the reaction force device and a steering torque of the driver, the output torque of the reaction force device corresponding to a physical quantity corresponding to the output torque of the reaction force device, the steering torque of the driver corresponding to a detection value of the torque sensor,
determining whether the steering state is the returning state or the turning state by comparing the torque difference between the output torque of the reaction force device and the steering torque of the driver to the predetermined value, the returning state being a state in which the steering wheel is returned by the driver, the turning state being a state in which the steering wheel is turned by the driver,
determining that the steering state is the returning state in response to the torque difference between the output torque of the reaction force device and the steering torque of the driver being greater than or equal to the predetermined value, and
determining that the steering state is the turning state in response to the torque difference between the output torque of the reaction force device and the steering torque of the driver being less than the predetermined value.

* * * * *